(12) United States Patent  
Wu et al.

(10) Patent No.: US 12,140,774 B2  
(45) Date of Patent: Nov. 12, 2024

(54) LIGHT FIELD-BASED BEAM CORRECTION SYSTEMS AND METHODS

(71) Applicant: UNIVERSITY OF MARYLAND, COLLEGE PARK, College Park, MD (US)

(72) Inventors: Chensheng Wu, Greenbelt, MD (US); Jonathan Ko, Davidsonville, MD (US); John R. Rzasa, College Park, MD (US); Christopher C. Davis, Annapolis, MD (US); Daniel Paulson, Hyattsville, MD (US)

(73) Assignee: University of Maryland, College Park, College Park, MD (US)

( * ) Notice: Subject to any disclaimer, the term of this patent is extended or adjusted under 35 U.S.C. 154(b) by 0 days.

(21) Appl. No.: 17/540,644

(22) Filed: Dec. 2, 2021

(65) Prior Publication Data

US 2022/0171204 A1 Jun. 2, 2022

Related U.S. Application Data

(60) Provisional application No. 63/120,655, filed on Dec. 2, 2020.

(51) Int. Cl.
*G02B 27/09* (2006.01)
*G02B 3/00* (2006.01)
(Continued)

(52) U.S. Cl.
CPC ....... *G02B 27/0916* (2013.01); *G02B 3/0037* (2013.01); *G02B 27/0025* (2013.01);
(Continued)

(58) Field of Classification Search
CPC .............. G02B 27/0916; G02B 3/0037; G02B 27/0025; G02B 27/0068; G02B 27/0087;
(Continued)

(56) References Cited

U.S. PATENT DOCUMENTS 8,022,345 B1 * 9/2011 Chang .................... G02B 27/46  
356/450  
9,182,289 B2 11/2015 Barrett et al.  
(Continued)

OTHER PUBLICATIONS

Ko et al., "An Adaptive Optics approach for Laser Beam Correction in Turbulence utilizing a Modified Plenoptic Camera," *Proceedings of the SPIE*, Sep. 2015, 9614: pp. 96140I1-I16. (17 pages).
(Continued)

*Primary Examiner* — Jennifer D Bennett  
*Assistant Examiner* — Erin R Garber  
(74) *Attorney, Agent, or Firm* — Rowan Tree Law Group, PLLC; Frederick F. Rosenberger

(57) ABSTRACT

An afocal sensor assembly detects a light beam with an aberrated wavefront. The afocal sensor assembly is configured to provide sorted four-dimensional (4D) light field information regarding the light beam, for example, via one or more plenoptic images. Based on the 4D light field information, a lossy reconstruction of an aberrated wavefront for one or more actuators of an adaptive optics (AO) device is performed. The AO device can be controlled based on the lossy reconstruction to correct the wavefront of the light beam. In some embodiments, the aberrated wavefront is due to passage of the light beam through atmospheric turbulence, and the lossy reconstruction and correction using the AO device is performed in less than 1.0 ms. The lossy reconstruction of the aberrated wavefront can have a phase accuracy in a range of $\lambda/2$ to $\lambda/30$.

19 Claims, 7 Drawing Sheets

(51) Int. Cl.
 G02B 27/00 (2006.01)
 G06T 7/557 (2017.01)
 G06T 7/70 (2017.01)
 H04N 23/957 (2023.01)
(52) U.S. Cl.
 CPC .......... *G02B 27/0068* (2013.01); *G06T 7/557* (2017.01); *G06T 7/70* (2017.01); *H04N 23/957* (2023.01); *G06T 2207/10052* (2013.01)
(58) Field of Classification Search
 CPC .................. G02B 3/0056; G02B 27/10; G02B 2027/0138; G02B 27/0075; G02B 27/0961; G02B 27/095; G02B 21/361; G06T 7/557; G06T 7/70; G06T 2207/10052; H04N 23/957
 See application file for complete search history.

(56) References Cited

U.S. PATENT DOCUMENTS

| | | | |
|---|---|---|---|
| 10,254,538 B2 | 4/2019 | Hattori et al. | |
| 10,989,591 B2 | 4/2021 | Scarcelli et al. | |
| 2019/0146305 A1* | 5/2019 | Xin | G02F 1/116 349/33 |
| 2020/0278257 A1* | 9/2020 | Berlatzky | G01J 9/02 |
| 2022/0128412 A1* | 4/2022 | Martínez Corral | G02B 30/10 |

OTHER PUBLICATIONS

Wu et al., "Determining the phase and amplitude distortion of a wavefront using a plenoptic sensor," *Journal of the Optical Society of America A*, May 2015, 32(5): pp. 964-978. (15 pages).

Wu et al., "Entropy Studies on Beam Distortion by Atmospheric Turbulence," *Proceedings of the SPIE*, Sep. 2015, 9614: pp. 96140F1-96140F15. (16 pages).

Wu et al., "Phase and amplitude beam shaping with two deformable mirrors implementing input plane and Fourier plane phase modifications," *Applied Optics*, Mar. 2018, 57(9): pp. 2337-2345. (9 pages).

Wu et al., "Plenoptic mapping for imaging and retrieval of the complex field amplitude of a laser beam," *Optics Express*, Dec. 2016, 24(26): pp. 29852-29871. (20 pages).

Andrews et al., "Propagation of a Gaussian-beam wave in general anisotropic turbulence," *Proceedings of the SPIE*, Oct. 2014, 9224: paper No. 922402. (12 pages).

Bahk et al., "Generation and characterization of the highest laser intensities ($10^{22}$ W/cm$^2$)," *Optics Letters*, Dec. 2004, 29(24): pp. 2837-2839. (3 pages).

Banet et al., "Digital-holographic detection in the off-axis pupil plane recording geometry for deep-turbulence wavefront sensing," *Applied Optics*, Jan. 2018, 57(3): pp. 465-475. (11 pages).

Beason et al., "Calculating structure function constant from measured $Cn^2$ in non-Kolmogorov and anisotropic turbulence including inner scale effects," *Applied Optics*, Sep. 2019, 58(25): pp. 6813-6819. (7 pages).

Beason et al., "Near ground measurements of beam shaping and anisotropic turbulence over concrete runway and grass range," *Proceedings of the SPIE*, Jan. 2018, 10770: paper No. 107700L. (12 pages).

Birks et al., "The photonic lantern," *Advances in Optics and Photonics*, Apr. 2015, 7: pp. 107-167. (61 pages).

Bonora et al., "Wavefront sensorless modal deformable mirror correction in adaptive optics: optical coherence tomography," *Optics Letters*, Nov. 2013, 38(22): pp. 4801-4804. (4 pages).

Bos et al., "Anisotropic non-Kolmogorov turbulence phase screens with variable orientation," *Applied Optics*, Mar. 2015, 54(8): pp. 2039-2045. (7 pages).

Carmichael Martins et al., "Measuring Ocular Aberrations Sequentially Using a Digital Micromirror Device," *Micromachines*, Feb. 2019, 10:117. (11 pages).

Cui et al., "Modified anisotropic turbulence refractive-index fluctuations spectral model and its application in moderate-to-strong anisotropic turbulence," *Journal of the Optical Society of America A*, Apr. 2016, 33(4): pp. 483-491. (9 pages).

Cui, Linyan, "Analysis of angle of arrival fluctuations for optical waves' propagation through weak anisotropic non-Kolmogorov turbulence," *Optics Express*, Mar. 2015, 23(5): pp. 6313-6325. (13 pages).

Foat et al., "The Visualization and Mapping of Turbulent Premixed Impinging Flames," *Combustion and Flame*, 2001, 125: pp. 839-851. (13 pages).

Fried, David L., "Branch point problem in adaptive optics," *J. Opt. Soc. Am. A*, Oct. 1998, 15(10): pp. 2759-2768. (10 pages).

Fried, David L., "Optical Resolution Through a Randomly Inhomogeneous Medium for Very Long and Very Short Exposures," *Journal of the Optical Society of America*, Oct. 1966, 56(10): pp. 1372-1379. (8 pages).

Fugate et al., "Measurement of atmospheric wavefront distortion using scattered light from a laser guide-star," *Nature*, Sep. 1991, 353: pp. 144-146. (3 pages).

Gladysz et al., "Estimation of turbulence strength, anisotropy, outer scale and spectral slope from an LED array," *Proceedings of SPIE*, Sep. 2015, 9614:961402. (7 pages).

Hofer et al., "Wavefront sensorless adaptive optics ophthalmoscopy in the human eye," *Optics Express*, Jul. 2011, 19(15): pp. 14160-14171. (12 pages).

Huang et al., "Modified Gaussian influence function of deformable mirror actuators," *Optics Express*, Jan. 2008, 16(1): pp. 108-114. (7 pages).

Ko et al., "Comparison of the plenoptic sensor and the Shack—Hartmann sensor," *Applied Optics*, May 2017, 56(13): pp. 3689-3698. (10 pages).

Leon-Saval et al., "Divide and conquer: an efficient solution to highly multimoded photonic lanterns from multicore fibres," *Optics Express*, Jul. 2017, 25(15): pp. 17530-17540. (11 pages).

Linhai et al., "Wavefront sensorless adaptive optics: a general model-based approach," *Optics Express*, Jan. 2011, 19(1): pp. 371-379. (9 pages).

Liu et al., "Experimental study of turbulence-induced beam wander and deformation of a partially coherent beam," *Optics Letters*, Jun. 2014, 39(11): pp. 3336-3339. (4 pages).

Lu et al., "Wave structure function and spatial coherence radius of plane and spherical waves propagating through oceanic turbulence," *Optics Express*, Nov. 2014, 22(22): p. 27112-27122. (11 pages).

Lutomirski et al., "Wave Structure Function and Mutual Coherence Function of an Optical Wave in a Turbulent Atmosphere," *Journal of the Optical Society of America*, Apr. 1971, 61(4): pp. 482-487. (6 pages).

Mccrae, Jr. et al., "Investigating the Outer Scale of Atmospheric Turbulence with a Hartmann Sensor," 2019 *IEEE Aerospace Conference*, Mar. 2019, PoD ISSN: 1095-323X. (6 pages).

Murphy et al., "Experimental detection of optical vortices with a Shack-Hartmann wavefront sensor," *Optics Express*, Jul. 2010, 18(15): p. 15448-15460. (13 pages).

Nasiri-Avanaki et al., "Comparative assessment of three algorithms to control a deformable mirror for an adaptive optics system with no wavefront sensor," *Proceedings of the SPIE*, Feb. 2011, 7904: paper No. 790415. (7 pages).

Nelson et al., "Atmospheric propagation and combining of high-power lasers: reply," *Applied Optics*, Oct. 2016, 55(29): pp. 8338-8339. (2 pages).

Nishizaki et al., "Deep learning wavefront sensing," *Optics Express*, Jan. 2019, 27(1): pp. 240-251. (12 pages).

Ragazzoni et al., "Adaptive-optics corrections available for the whole sky," *Nature*, Jan. 2000, 403: pp. 54-56. (3 pages).

Sprangle et al., "Incoherent Combining and Atmospheric Propagation of High-Power Fiber Lasers for Directed-Energy Applications," *IEEE Journal of Quantum Electronics*, Feb. 2009, 45(2): pp. 138-148. (11 pages).

(56) References Cited

OTHER PUBLICATIONS

Thornton et al., "Deep-turbulence wavefront sensing using digital holography in the on-axis phase shifting recording geometry with comparisons to the self-referencing interferometer," *Applied Optics*, Feb. 2019, 58(5): pp. A179-A189. (11 pages).
Tian et al., "DNN-based aberration correction in a wavefront sensorless adaptive optics system," *Optics Express*, Apr. 2019, 27(8): p. 10765-10776. (12 pages).
Toselli et al., "General scale-dependent anisotropic turbulence and its impact on free space optical communication system performance," *Journal of the Optical Society of America A*, May 2015, 32(6): pp. 1017-1025. (9 pages).
Toselli et al., "Light propagation through anisotropic turbulence," *J. Opt. Soc. Am. A*, Mar. 2011, 28(3): pp. 483-488. (6 pages).
Velluet et al., "Data collection and preliminary results on turbulence characterisation and mitigation techniques," *SPIE Security& Defence 2019*, Sep. 2019, hal-02408796. (13 pages).
Vohnsen et al., "Hartmann-Shack wavefront sensing without a lenslet array using a digital micromirror device," *Applied Optics*, Aug. 2018, 57(22): pp. E199-E204. (6 pages).
Voronstov, Mikhail A., "Decoupled stochastic parallel gradient descent optimization for adaptive optics: integrated approach for wave-front sensor information fusion," *J. Opt. Soc. Am. A*, Feb. 2002, 19(2): pp. 356-368. (13 pages).
Vorontsov et al., "Adaptive Array of Phase-Locked Fiber Collimators: Analysis and Experimental Demonstration," *IEEE Journal of Selected Topics in Quantum Electronics*, Mar./Apr. 2009, 15(2): pp. 269-280. (12 pages).
Wang et al., "Measuring anisotropy ellipse of atmospheric turbulence by intensity correlations of laser light," *Optics Letters*, Mar. 2017, 42(6): pp. 1129-1132. (4 pages).
Watnik et al., "Wavefront sensing in deep turbulence," *Optics and Photonics News*, Oct. 2018, 29(10): pp. 38-45. (8 pages).
Wu et al., "Comparison between the plenoptic sensor and the light field camera in restoring images through turbulence," *OSA Continuum*, Sep. 2019, 2(9): pp. 2511-2525. (15 pages).
Wu et al., "Near ground surface turbulence measurements and validation: a comparison between different systems," *Proceedings of SPIE*, Sep. 2018, 10770: 107700K (12 pages).
Wu et al., "Observing single and multiple laser glints through anisotropic turbulence with a plenoptic sensor," *Proceedings of SPIE*, Sep. 2019, 11133:111330Y. (11 pages).
Wu et al., "Using a plenoptic sensor to reconstruct vortex phase structures," *Optics Letters*, Jul. 2016, 41(14): pp. 3169-3172. (4 pages).
Xiao et al., "Gaussian beam propagation in anisotropic turbulence along horizontal links: theory, simulation, and laboratory implementation," *Applied Optics*, May 2016, 55(15): pp. 4079-4084. (6 pages).
Yu et al., "Coherent combining of a 4 kW, eight-element fiber amplifier array," *Optics Letters*, Jul. 2011, 36(14): pp. 2686-2688. (3 pages).
Yuan et al., "Beam wander relieved orbital angular momentum communication in turbulent atmosphere using Bessel beams," *Scientific Reports*, Feb. 2017, 7:42276. (7 pages).
Zhang et al., "Integrating Mach-Zehnder interferometry with TPIV to measure the time-resolved deformation of a compliant wall along with the 3D velocity field in a turbulent channel flow," *Exp Fluids*, Nov. 2015, 56:203. (22 pages).
Zhou et al., "Coherent Beam Combining of Fiber Amplifiers Using Stochastic Parallel Gradient Descent Algorithm and Its Application," *IEEE Journal of Selected Topics in Quantum Electronics*, Mar./Apr. 2009, 15(2): pp. 248-256. (9 pages).
Zhou et al., "Influence of atmospheric turbulence on the properties of specular and antispecular beams," *Applied Optics*, Aug. 2016, 55(24): pp. 6757-6762. (6 pages).
Zhu et al., "Free-Space Optical Communication Through Atmospheric Turbulence Channels," *IEEE Transactions on Communications*, Aug. 2002, 50(8): pp. 1293-1300. (8 pages).

* cited by examiner

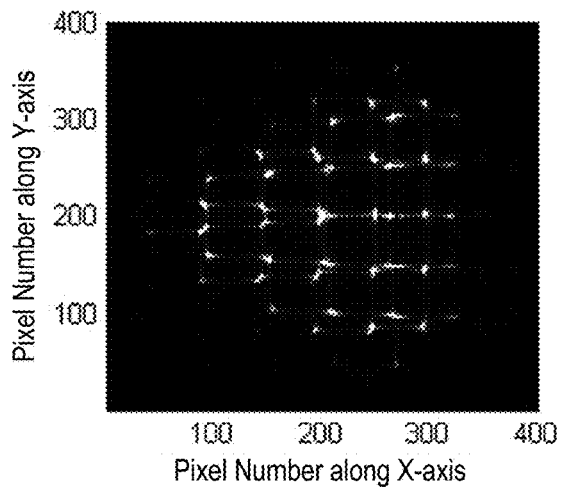
FIG. 5A
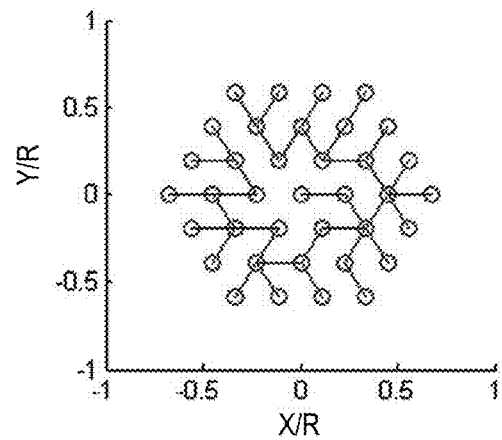
FIG. 5B
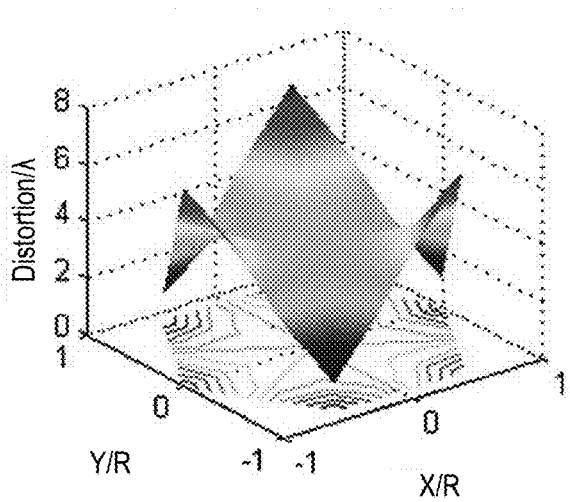
FIG. 5C
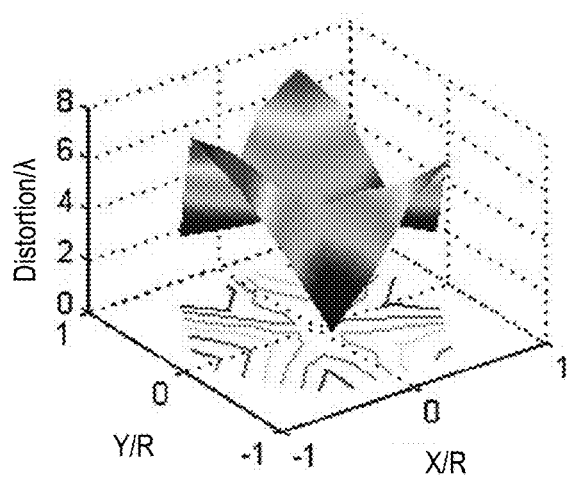
FIG. 5D
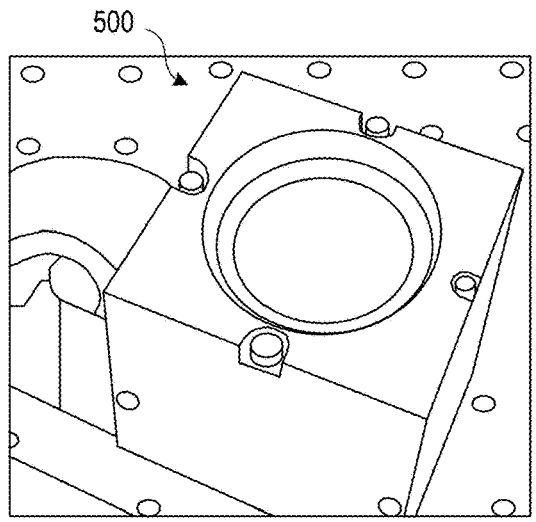
FIG. 5E
FIG. 5F

LIGHT FIELD-BASED BEAM CORRECTION SYSTEMS AND METHODS

CROSS-REFERENCE TO RELATED APPLICATION

The present application claims the benefit of U.S. Provisional Application No. 63/120,655, filed Dec. 2, 2020, entitled "Light Field-Based Beam Correction System and Method of Using the Same," which is incorporated by reference herein in its entirety.

STATEMENT REGARDING FEDERALLY SPONSORED RESEARCH

This invention was made with government support under N00014-12-1-1029, N00014-16-1-2944, and N00014-18-1-2008 awarded by the Office of Naval Research (ONR). The government has certain rights in the invention.

FIELD

The present disclosure relates generally to light beam systems, and more particularly, to light beam correction based at least in part on detected light field information.

SUMMARY

Embodiments of the disclosed subject matter system can employ an afocal sensor assembly to analyze a sampled light beam by its four-dimensional (4D) light field and can subsequently guide an adaptive optics (AO) device to correct the light beam for aberrations in the same light field space. In conventional AO techniques, aberration corrections generally focus on low range regimes (e.g., $\lambda/30$ to $\lambda/50$, with $\lambda$ denoting the wavelength of the laser beam). While such techniques may be effective for astronomical purposes, they are generally insufficient to correct for deep turbulence, for example, as experienced in ground-to-ground based optical systems. In contrast, in embodiments of the disclosed subject matter, the aberration correction can be suitable for an accuracy range of $\lambda/2$ to $\lambda/30$, which is primarily the distortion of a laser beam via long range atmospheric distortions. Embodiments of the disclosed subject matter may be particularly useful in correcting terrestrial-transmitted light beams where accuracy is less of a concern than speed or robustness of the beam analysis, for example, directed laser energy systems, free-space laser communications, light detection and ranging (LIDAR), and remote sensing applications.

In some embodiments, the afocal sensor assembly can be configured to arrange images of the sampled light beam into an array of two-dimensional (2D) blocks of sorted phase tilts, with each block further carrying the sorted 2D amplitude information based on geometry inside the beam. In some embodiments, the afocal sensor assembly can comprise a plenoptic sensor, a Shack-Hartmann system (SHS), a pyramid wavefront sensor, or a light-field camera. The sorted 4D light information can be directly employed to control the AO device to provide a desired correction of the light beam, for example, to correct turbulence in real time or substantially real time (e.g., less than 1 ms from detection to correction). In some embodiments, the AO device can comprise a deformable mirror, a digital micromirror array device, a spatial light modulator, or phase modulators (e.g., pistons) of a fiber laser phased array.

In one or more embodiments, a light beam correction system can comprise a plenoptic sensor module and a controller. The plenoptic sensor module can comprise an objective lens assembly (OLA), a microlens array (MLA), and a photodetector. The OLA can have a first effective focal length (EFL) and can be arranged to receive a light beam with an aberrated wavefront and a wavelength, $\lambda$. The MLA can have a second EFL and can be arranged to receive the light beam from the OLA. The photodetector can have a two-dimensional array of pixels and can be arranged to receive the light beam from the MLA. A focal plane at the first EFL behind the OLA can coincide with a focal plane at the second EFL in front of the MLA, and an imaging plane of the photodetector can coincide with a focal plane at the second EFL behind the MLA.

The controller can comprise one or more processors and computer readable storage media storing instructions. The instructions can, when executed by the one or more processors, cause the controller to receive one or more signals from the photodetector indicative of sorted 4D light field information regarding the light beam, and to reconstruct the aberrated wavefront of the light beam based on the sorted 4D light-field information. The reconstructed wavefront can have a phase accuracy in a range of $\lambda/2$ to $\lambda/30$, inclusive. The instructions can, when executed by the one or more processors, further cause the controller to control, based on the reconstructed wavefront, a plurality of actuators of an AO device so as to modify the light beam to correct for an aberration of the wavefront.

In one or more embodiments, a system can comprise a light beam optical assembly and a light beam correction module. The light beam optical assembly can comprise an AO device and can be constructed to output a light beam having a wavelength, $\lambda$. The light beam correction module can be constructed to detect the light beam after passing through atmospheric turbulence and to generate one or more control signals that cause the AO device to modify the light beam to correct for aberration of a wavefront of the light beam due to the atmospheric turbulence. The light beam correction module can comprise an afocal sensor assembly and a controller.

The controller can comprise one or more processors and computer readable storage media storing instructions. The instructions can, when executed by the one or more processors, cause the controller to perform a lossy reconstruction of an aberrated wavefront for actuators of the AO device based on one or more images of the light beam detected by the afocal sensor assembly, and to control the AO device based on the lossy reconstruction to correct the light beam.

In some embodiments, the afocal sensor assembly can comprise a plenoptic sensor, a SHS, a pyramid wavefront sensor, a light-field camera, or any combination of the foregoing. In some embodiments, the lossy reconstruction and/or the light beam correction by the AO device can be performed in less than or equal to 1.0 ms.

In one or more embodiments, a method can comprise directing a light beam having a wavelength, $\lambda$, through atmospheric turbulence such that a wavefront of the light beam is aberrated. The method can further comprise detecting a plenoptic image of the light beam after the atmospheric turbulence using a plenoptic sensor module. The plenoptic sensor module can comprise an OLA, an MLA, and a photodetector. The OLA can have a first EFL, and the MLA can have a second EFL. A focal plane at the first EFL behind the OLA can coincide with a focal plane at the second EFL in front of the MLA, and an imaging plane of the photodetector can coincide with a focal plane at the second EFL behind the MLA. The method can also comprise modifying, using an AO device, the light beam prior to the atmospheric turbulence based on a sampled set of pixels in the detected plenoptic image to correct for the aberrated wavefront that are correspondingly mapped to actuator geometry of the AO device.

Any of the various innovations of this disclosure can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the disclosed technology will become more apparent from the following detailed description, which proceeds with reference to the accompanying figures.

BRIEF DESCRIPTION OF THE DRAWINGS

Embodiments will hereinafter be described with reference to the accompanying drawings, which have not necessarily been drawn to scale. Where applicable, some elements may be simplified or otherwise not illustrated in order to assist in the illustration and description of underlying features. For example, in some figures, the propagation of light has not been shown or has been illustrated using block arrows or solid/dashed lines rather than employing ray diagrams. Throughout the figures, like reference numerals denote like elements.

FIG. 5A shows an exemplary image obtained by a plenoptic sensor for a light beam with a trefoil distortion.

FIG. 5B shows an exemplary collection of actuator nodes of a deformable mirror according to a maximum spanning tree approach for performing a lossy reconstruction.

FIGS. 5C-5D are graphs illustrating a wavefront of the light beam with trefoil distortion before and after correction, respectively, by a deformable mirror based on a lossy reconstruction of the wavefront from the plenoptic image of FIG. 5A.

FIG. 5E is a picture of the deformable mirror employed in the experiments underlying FIGS. 5A-5D.

FIG. 5F shows the actuator node layout of the deformable mirror of FIG. 5E, with corresponding reconstruction labeling.

DETAILED DESCRIPTION

General Considerations

Figure 1A:
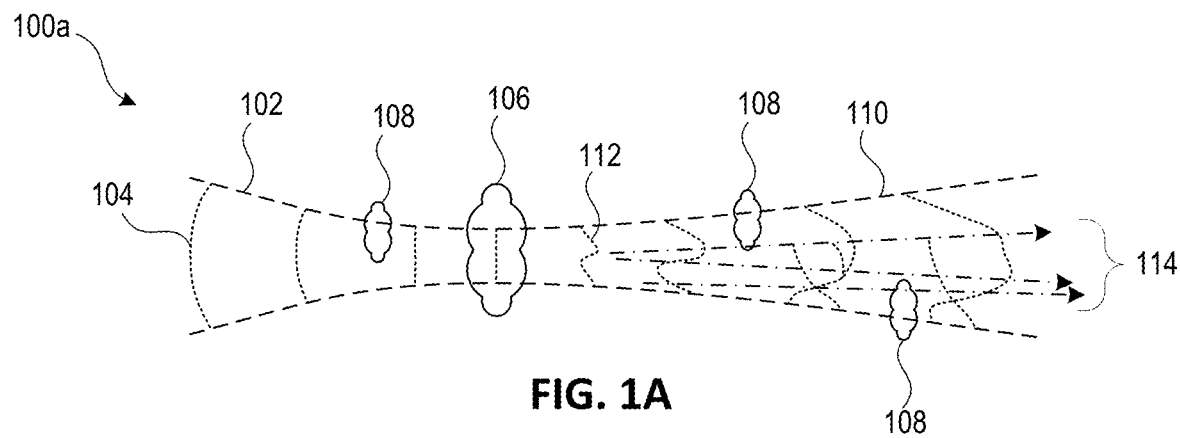
FIG. 1A illustrates aberration of a light beam by atmospheric turbulence.

For purposes of this description, certain aspects, advantages, and novel features of the embodiments of this disclosure are described herein. The disclosed methods and systems should not be construed as being limiting in any way. Instead, the present disclosure is directed toward all novel and nonobvious features and aspects of the various disclosed embodiments, alone and in various combinations and sub-combinations with one another. The methods and systems are not limited to any specific aspect or feature or combination thereof, nor do the disclosed embodiments require that any one or more specific advantages be present, or problems be solved. The technologies from any embodiment or example can be combined with the technologies described in any one or more of the other embodiments or examples. In view of the many possible embodiments to which the principles of the disclosed technology may be applied, it should be recognized that the illustrated embodiments are exemplary only and should not be taken as limiting the scope of the disclosed technology.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one skilled in the art.

The disclosure of numerical ranges should be understood as referring to each discrete point within the range, inclusive of endpoints, unless otherwise noted. Unless otherwise indicated, all numbers expressing quantities of components, molecular weights, percentages, temperatures, times, and so forth, as used in the specification or claims are to be understood as being modified by the term "about." Accordingly, unless otherwise implicitly or explicitly indicated, or unless the context is properly understood by a person skilled in the art to have a more definitive construction, the numerical parameters set forth are approximations that may depend on the desired properties sought and/or limits of detection under standard test conditions/methods, as known to those skilled in the art. When directly and explicitly distinguishing embodiments from discussed prior art, the embodiment numbers are not approximates unless the word "about" is recited. Whenever "substantially," "approximately," "about," or similar language is explicitly used in combination with a specific value, variations up to and including 10% of that value are intended, unless explicitly stated otherwise.

Directions and other relative references may be used to facilitate discussion of the drawings and principles herein, but are not intended to be limiting. For example, certain terms may be used such as "inner," "outer,", "upper," "lower," "top," "bottom," "interior," "exterior," "left," "right," "front," "back," "rear," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" part can become a "lower" part simply by turning the object over. Nevertheless, it is still the same part and the object remains the same.

As used herein, "comprising" means "including," and the singular forms "a" or "an" or "the" include plural references unless the context clearly dictates otherwise. The term "or" refers to a single element of stated alternative elements or a combination of two or more elements, unless the context clearly indicates otherwise.

Although there are alternatives for various components, parameters, operating conditions, etc. set forth herein, that does not mean that those alternatives are necessarily equivalent and/or perform equally well. Nor does it mean that the alternatives are listed in a preferred order, unless stated otherwise. Unless stated otherwise, any of the groups defined below can be substituted or unsubstituted.

Unless explained otherwise, all technical and scientific terms used herein have the same meaning as commonly understood to one skilled in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Features of the presently disclosed subject matter will be apparent from the following detailed description and the appended claims.

Overview of Terms

The following explanations of specific terms and abbreviations are provided to facilitate the description of various aspects of the disclosed subject matter and to guide those skilled in the art in the practice of the disclosed subject matter.

Light or optical: Electromagnetic radiation in the visible or near-infrared (NIR) regimes, e.g., having a wavelength between 400 nm and 2000 nm, inclusive.

Afocal: An optical system or assembly that does not produce a single focus for a point source. For example, in the context of a plenoptic sensor employing a microlens array (MLA), each cell (e.g., microlens) of the MLA can focus light onto a respective subset of pixels of a photodetector.

Four-dimensional (4D) Light-Field Information: Information resulting from sampling an optical beam in its 4D phase space, with two-dimensions (2D) indicating geometric information and 2D indicating angular information.

Aberration: Any deviation (including combination of deviations) from an intended or predetermined state of a light beam. For example, aberrations in the wavefront of a light beam can arise due to the passage of the light beam through atmospheric turbulence.

Correction: Reverting the light beam to its state prior to aberration, or at least reducing the deviation(s) of the aberrated light beam from the intended or predetermined state. In some embodiments, the correction may not completely compensate for the deviations, but the correction may otherwise be sufficient for a particular application (e.g., long-range free-space optical or underwater optical communications).

INTRODUCTION

Disclosed herein are systems and methods for performing light field-based beam correction. In some embodiments, an afocal sensor assembly to analyze a sampled light beam by its four-dimensional (4D) light field, for example, by recording full information of the complex field amplitude of an incident beam (e.g., phase distribution and amplitude distribution). In some embodiments, sorted 4D light field information can be used to subsequently guide an adaptive optics (AO) device to correct the light beam for aberrations in the same light field space. In some embodiments, the system can employ a lossy reconstruction of an aberrated wavefront for actuators of the AO device based on 4D light field information, for example, using a graph-theory-based image processing and control approach to directly form actuator commands from images produced by the afocal sensor assembly. In such a graph-theory-based approach, vertices can be defined as geometric centers of actuators (or tile directors) of the AO device and edges can be defined as phase changes between adjacent actuators, with phase information extracted from the images by the afocal sensor assembly.

In some embodiments, the systems and methods disclosed herein can be used to direct laser beams (e.g., high energy laser beams) through atmospheric turbulence (e.g., air or liquid) with high efficiency of power delivery. In general, fluctuations in the index of refraction of the atmosphere give rise to atmospheric turbulence and occur on the order of millisecond timescales. For example, FIG. 1A illustrates an exemplary configuration 100a of a light beam 102 propagating in free space through an atmosphere (e.g., air or liquid). The light beam 102 can initially have a wavefront 104; however, interaction with turbulence 106, 108 in the atmosphere can cause the wavefront 112 of the downstream beam 110 to become aberrated, as represented by phase tilts 114. A segment 106 of the atmosphere may be a main contributor to the turbulence, as compared to other turbulence 108 in the atmosphere that causes minor distortions to the beam. In some embodiments, the phase tilts 114 can be detected using an afocal sensor assembly, for example, to reconstruct a phase screen at a location corresponding to the main turbulence 106 and/or to determine the phase distortion resulting from the turbulence 106.

Figure 1B:
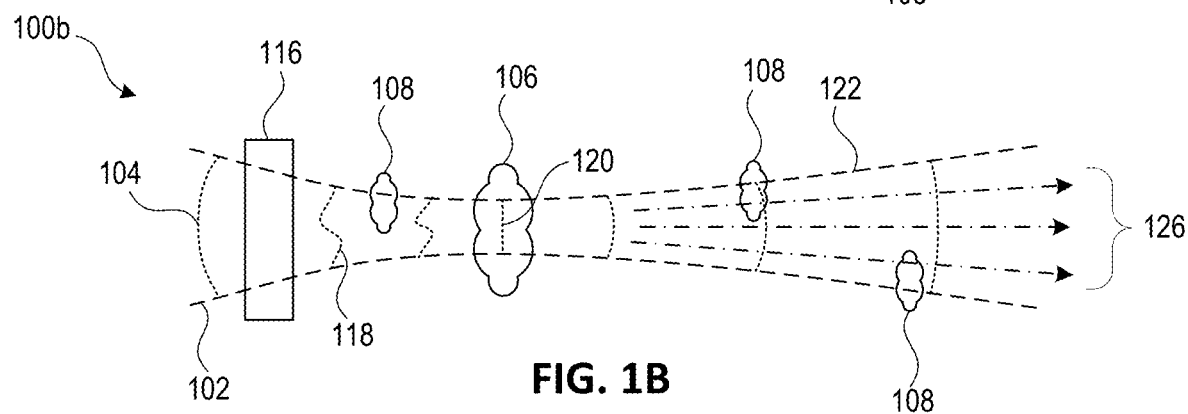
FIG. 1B illustrates an exemplary correction of light beam aberration, according to one or more embodiments of the disclosed subject matter.

In some embodiments, an AO device can be controlled to modify the wavefront prior to the turbulence such that the turbulence-induced phase distortion on the light beam can be at least partially canceled out by the propagation through the turbulence 106. For example, FIG. 1B illustrates an exemplary configuration 100b of light beam 102 propagating in free space through the atmosphere, similar to FIG. 1A. However, the light beam 102 can be modified by AO device 116, such that the initial wavefront 104 is modified to have a distorted wavefront 118 prior to turbulence 106. In some embodiments, reconstructed phase information from the afocal sensor assembly (not shown) can be sent to the AO device 116 to compensate for aberration induced by the turbulence, for example, by causing the AO device 116 to phase conjugate the incoming wavefront 104 such that the resulting distorted wavefront 118 can be corrected back to a non-distorted state (e.g., plane wave) by the turbulence 106 (e.g., as shown by wavefront 120 and corresponding phase tilts 126 of downstream beam 122).

Accordingly, embodiments of the disclosed subject matter are able to provide correction (e.g., as measured from a time of initial beam detection to control of the AO device) of less than 1 ms (e.g., closed loop operation at a frequency at or greater than 1 kHz), thus allowing sensing of the incoming wavefront, reconstructing of the wavefront, and application of a phase conjugate to the AO device before the atmospheric turbulence can change. For example, in some embodiments, the systems and methods disclosed herein can serve as a universal beam director for a directed energy (DE) system, such as deformable mirror (DM) guided high energy laser system or phase modulated (e.g., piston controlled) fiber laser phased array.

Light Beam Systems with Correction

Figure 1C:
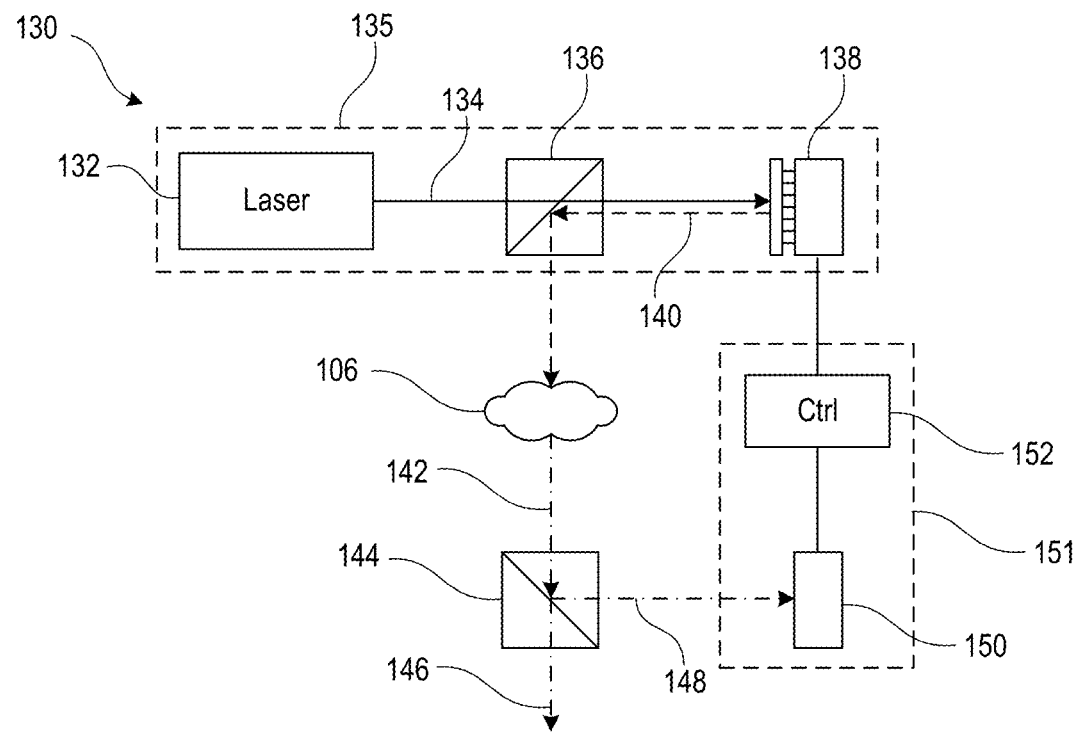
FIG. 1C is a simplified schematic diagram of an exemplary system with light beam correction using an afocal sensor assembly and a deformable mirror, according to one or more embodiments of the disclosed subject matter.

Referring to FIG. 1C, an exemplary light beam system 130 that employs light beam correction is shown. The system 130 can include a light beam optical assembly 135 and a light beam correction module 151. The light beam optical assembly 135 can include a laser 132 that directs a light beam 134 through a beam splitter 136 to interact with an AO device 138. In some embodiments, the light beam 134 can be substantially monochromatic and have a wavelength in a range of 400 nm to 2000 nm, inclusive. In the illustrated example, the AO device 138 can be a deformable mirror or digital micromirror array device, such that light 140 as modified by the AO device 138 is reflected back along the optical path to beam splitter 136, which redirects the light beam 140 for atmospheric transmission through turbulence 106. Alternatively, in some embodiments, the AO device 138 can be a spatial light modulator or other adaptive optic type device. In such configurations, the beam splitter 136 may be omitted, and the laser 132 and AO device 138 rearranged such that the light beam 134 passes directly through AO device 138 en route to atmospheric transmission through turbulence 106.

The light beam 142 as modified by turbulence 106 can be passed to beam splitter 144, which redirects a sampled portion of the light beam 148 to light beam correction module 151, while allowing the remaining portion 146 of the light beam to continue propagating downstream for subsequent use (e.g., detection by a destination receiver of a free space communication system, etc.). The sampled light beam 148 can be incident on afocal sensor assembly 150, which can be configured to detect 4D light-field information of the sampled light beam 148. In some embodiments, the afocal sensor assembly 150 comprises a plenoptic sensor, for example, as described with respect to FIGS. 2A-2B below and elsewhere herein. Alternatively, in some embodiments, the afocal sensor assembly 150 comprises a Shack-Hartman system (SHS), a light-field camera, a pyramid wavefront sensor, or any combination thereof. In some embodiments, the 4D light-field information from the afocal sensor assembly 150 can be used by controller 152 to perform lossy reconstruction of a wavefront for actuators of the AO device 138 (or other direct command signals). In some embodiments, the lossy reconstruction performed by controller 152 can involve taking actuator centers of the AO device 138 as physical nodes and building a network among the nodes to achieve fast and intelligent wavefront sensing and correction. As a result, the full wavefront does not have to be reconstructed by the controller 152. The controller 152 can subsequently control the AO device 138 based on the lossy reconstructed wavefront to correct the light beam 142 for aberrations introduced by turbulence 106.

Figure 1D:
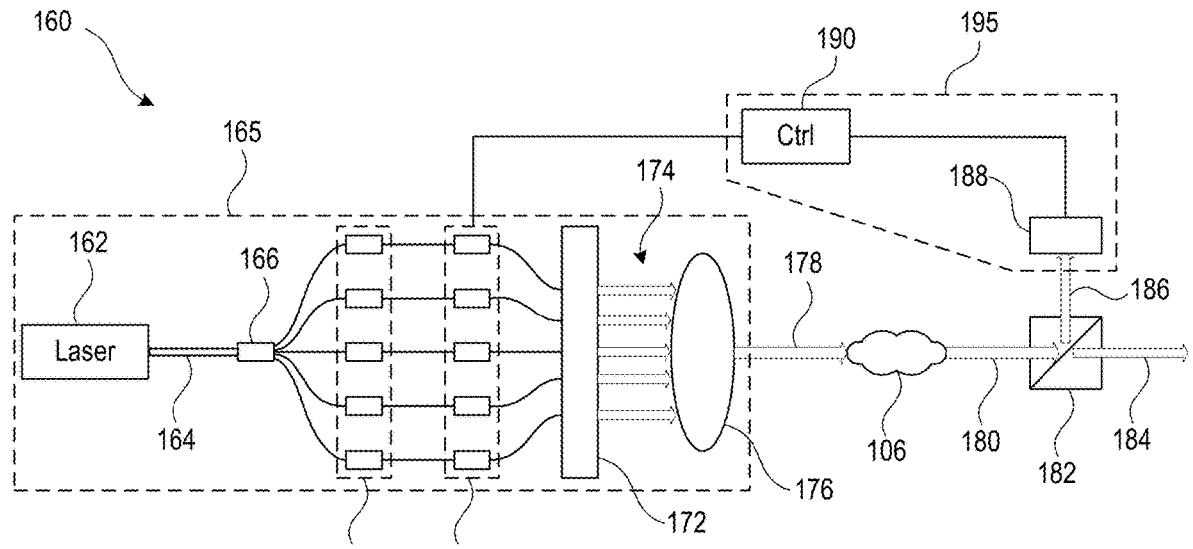
FIG. 1D is a simplified schematic diagram of an exemplary system with light beam correction using an afocal sensor assembly and a fiber laser phased array, according to one or more embodiments of the disclosed subject matter.

In the illustrated example of FIG. 1C, the light beam system 130 employs a laser 132 and separate AO device 138. However, in some embodiments, the light beam can be generated using a fiber laser phased array, with adaptive optic aspects integrated into the light beam generation therefrom. For example, FIG. 1D illustrates another exemplary light beam system 160 employing light correction. The system 160 can include a light beam optical assembly 165 and a light beam correction module 195. The light beam optical assembly 165 can include a laser 162 that directs a light beam into an input optical fiber 164, which is branched into multiple separate fibers via splitter 166. Although only five fiber branches originating from splitter 166 are shown in FIG. 1D, greater or fewer fiber branches are also possible according to one or more contemplated embodiments. For each fiber branch, the light beam passes through a respective one of a power amplifier array 168 and a respective one of a phase modulator array 170 (e.g., piston) before being collimated by collimator array 172 and formed into an output light beam 178 by transform lens 176 for atmospheric transmission through turbulence 106.

The light beam 180 as modified by turbulence 106 can be passed to beam splitter 182, which redirects a sampled portion 186 of the light beam to light beam correction module 195, while allowing the remaining portion 184 of the light beam to continue propagating downstream for subsequent use. As with the example of FIG. 1C, the sampled light beam 186 in the example of FIG. 1D can be incident on afocal sensor assembly 188, which can be configured to detect 4D light-field information of the sampled light beam 148. The 4D light-field information from the afocal sensor assembly 188 can be used by controller 190 to perform lossy reconstruction of a wavefront for pistons 170 of the fiber laser phased array (or other direct command signals). The controller 190 can subsequently control the pistons 170 based on the lossy reconstructed wavefront to correct the light beam 180 for aberrations introduced by turbulence 106.

In some embodiments, a lossy reconstruction of a wavefront for actuators of the AO device can be performed (e.g., by controller 152 and/or controller 190) based on images from the afocal sensor assembly. This reconstruction can be relatively fast procedure (e.g., on the order of milliseconds or less) with few iterations (e.g., on the order of 100 or less, such as 10 or less, or even as few as one) since full wavefront reconstruction is not necessary. Rather, as long as commands for some actuators of the AO device can be determined that modify the beam toward a better outcome, the remaining actuators of the AO device can remain idle. In some embodiments, given any actuator layout of an AO device, the controller can provide a set of control suggestions for each actuator of the AO device, or a subset of actuators (e.g., with other actuators remaining idle), from the sorted 4D intensity and phase gradient map from the afocal sensor assembly (e.g., as represented in a plenoptic image). In some embodiments, any choice from a suggestion set or an averaging method can be employed, which, although lossy by nature, can still improve the beam correction. In some embodiments, lossy selections can be determined using graph-based algorithms, for example, as described in further detail hereinbelow.

In some embodiments, after the large wavefront distortions have been removed using the lossy reconstruction, further corrections can be employed. For example, in some embodiments, a stochastic parallel gradient descent (SPGD) algorithm and/or an SHS can be implemented to fine tune the wavefront correction. Alternatively or additionally, in some embodiments, machine learning can be implemented to further enhance aberration correction performance. For example, the lossy reconstruction can act as pre-conditioner that reduces a pixel requirement for subsequent machine learning. Alternatively or additionally, machine learning can be incorporated into the lossy reconstruction itself, for example, to improve accuracy and robustness in extracting actuator values (e.g., $S_{ij}$) to avoid issues with overexposure and/or defocus.

Afocal Sensor Assemblies with Plenoptic Sensors

Figure 2A:
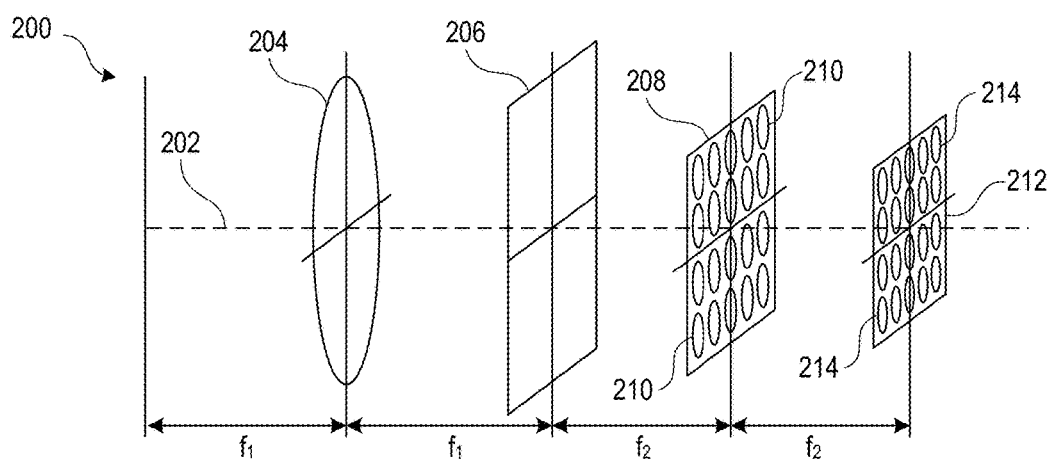
FIG. 2A is a simplified schematic diagram of an exemplary configuration of a plenoptic sensor, according to one or more embodiments of the disclosed subject matter.
Figure 2B:
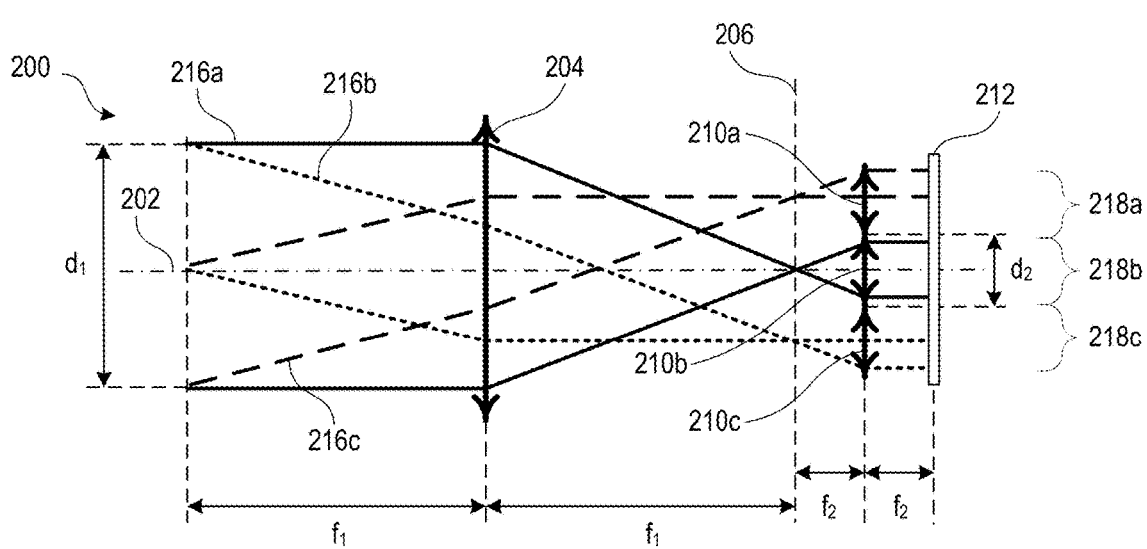
FIG. 2B is a simplified schematic diagram illustrating operation of the plenoptic sensor of FIG. 2A for plane waves with different phase tilts, according to one or more embodiments of the disclosed subject matter.

Referring to FIGS. 2A-2B, an exemplary plenoptic sensor 200 is shown, which sensor can be used as the afocal sensor assembly in one or more embodiments of the disclosed subject matter. In the illustrated example, the plenoptic sensor 200 comprises an objective lens assembly (OLA) 204 having a first effective focal length, $f_1$, and a first diameter, $d_1$, and a microlens array (MLA) 208 having a second effective focal length, $f_2$, and a second diameter, $d_2$. The OLA 204 and the MLA 208 can be arranged along an optical axis 202 such that a focal plane behind the OLA 204 coincides with a focal plane in front of the MLA 208, as shown at plane 206. The plenoptic sensor 200 can further include a photodetector (not shown), which has an image plane 212 disposed along optical axis 202 at $f_2$ behind the MLA 208. For example, in some embodiments, the photodetector can be an image-forming camera or other 2-D photodetector array (e.g., 2-D array of pixels), such as a complementary metal-oxide semiconductor (CMOS) or charge-coupled device (CCD).

In the plenoptic sensor 200, the OLA 204 can perform a Fourier transform on the incoming light patches located at the front focal plane, $f_1$. The Fourier transformed light patches are located at the back focal plane, $f_1$, which is then sampled and imaged by the MLA 208 onto the image plane 212 of the photodetector. As illustrated in FIG. 2B, rays containing a higher angular spectrum can be separated into MLA cells 210 away from the center of the MLA 208. Indeed, as the angular spectrum of the rays increases, the rays are in turn imaged by MLA cells 210 further and further away from the center. The fan of rays that leave the same point on the front focal plane, $f_1$, of OLA 204 will end up in the same pixel on the image sensor (image plane 212), and their phase changes are constant. For example, for an incident plane wave 216a with no phase tilt, the plenoptic sensor 200 will map the wave to a central MLA cell 210b that fills a disk area 218b in the image plane 212. In contrast, plane waves 216b, 216c having opposite phase tilts are mapped to different MLA cells, e.g., 210c and 210a, respectively, and regional sections within the cell images, respectively. Therefore, the plenoptic sensor 200 can distinguish the rays by their angular spectrum in addition to their geometric information. The phase information is preserved along the transforms of the optical component inside the plenoptic sensor 200. Thus, the index of the MLA cell 210 (and the corresponding cell images 214 on the image plane 212) can be representative of the local tip/tilt of the incoming light patches and rays, which information can be used to reconstruct the wavefront. Such an optical arrangement can make every pixel in the image plane 212 useful in indicating deterministic information about the wavefront distortion.

In some embodiments, the OLA 204 and the MLA 208 can be constructed such that their f-numbers are matched (e.g., $f_1:d_1=f_2:d_2$), such that cell images 214 can be rendered side-by-side at the image plane 212. In some embodiments, the effective focal length, $f_1$, of the OLA 204 is in a range of 750 mm to 3500 mm, inclusive. In some embodiments, the effective focal length, $f_2$, of the MLA 208 is in a range of 7.1 mm to 31.0 mm, inclusive. In some embodiments, the focal lengths of the OLA 204 and/or the MLA 208 can be determined in accordance with a desired phase reconstruction accuracy and/or gradient slope. For example, in some embodiments, the phase reconstruction accuracy is selected to be in a range of $\lambda/2$ to $\lambda/30$, inclusive, where $\lambda$ is the wavelength of the light beam, and/or the gradient slope is selected to be less than $0.35\pi$ per mm (e.g., $0.175\pi$ per mm). The gradient slope can be related to the phase reconstruction accuracy by the dimensions of the MLA. For example, for an MLA cell size of 0.5 mm, a gradient slope converts to phase reconstruction accuracy of $\lambda/23$ (e.g., $0.5 \times 0.175\pi/2\pi$). In some embodiments, the MLA parameters can be related to pixel size and desired reconstruction accuracy by:

$$\frac{d_2}{f_2} > \frac{\text{gradient slope}/2\pi}{\lambda/\text{Pixel size}}. \qquad (1)$$

Thus, if the ratio ($\lambda$/pixel size) changes due to hardware selection, the EFL of the MLA can be selected accordingly to provide a desired phased reconstruction accuracy.

Light Field-Based Beam Correction Methods

Figure 3:
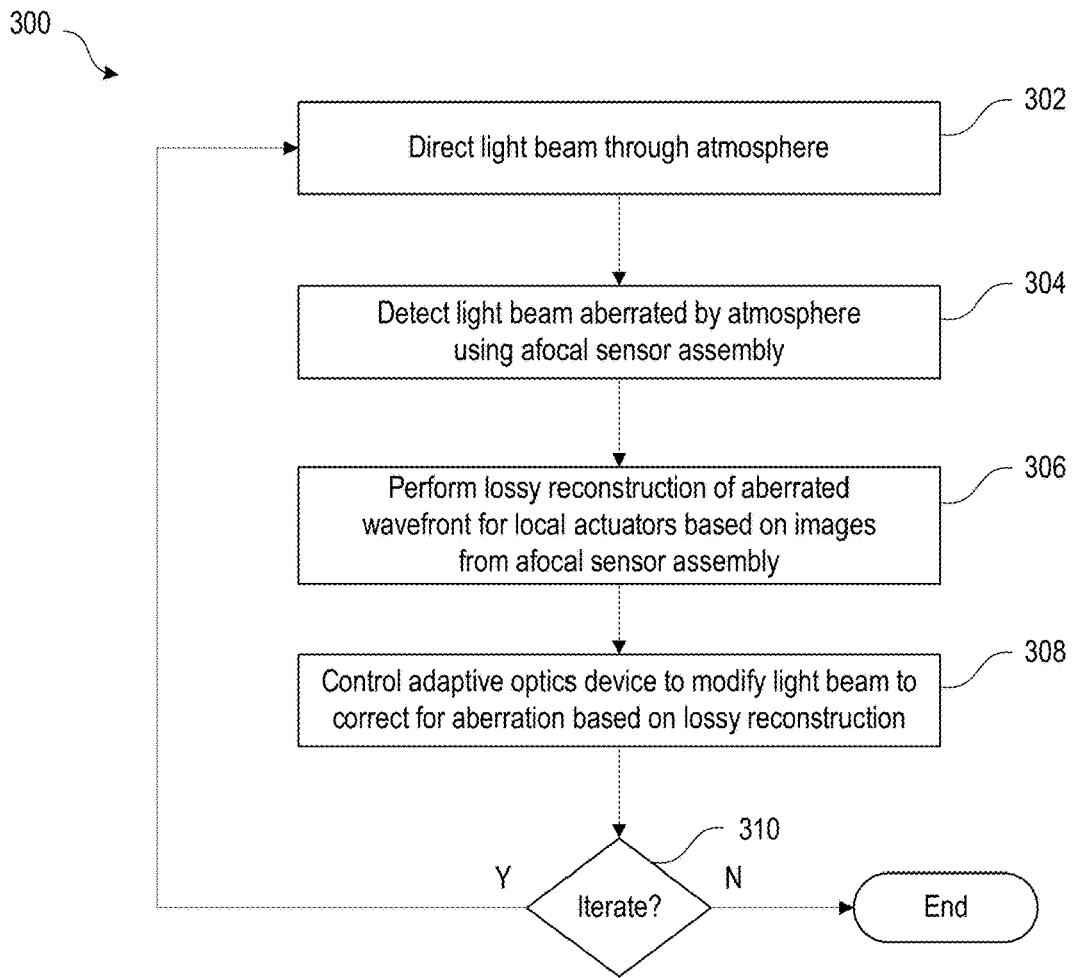
FIG. 3 is a process flow diagram of an exemplary method for light beam direction with correction, according to one or more embodiments of the disclosed subject matter.

FIG. 3 illustrates an exemplary method 300 for directing and correcting a light beam. The method 300 can initiate at process block 302, where a light beam is generated and directed through an atmosphere (e.g., air or liquid) having turbulence therein. For example, the directing of process block 302 can include using a laser or fiber laser phased array to generate a substantially monochromatic light beam, e.g., having a wavelength in a range from 400 nm to 2000 nm, inclusive. In some embodiments, the directing of process block 302 can be effective to and/or form a part of directed laser energy, free-space laser communication, LIDAR, or a remote sensing.

The method 300 can proceed to process block 304, where an afocal sensor assembly is used to detect a light beam, or a portion thereof, after aberration induced by the turbulence. The afocal sensor assembly can be configured to provide 4D light-field information of the detected light beam. For example, in some embodiments, the detection can include obtaining a plenoptic image, which comprises an array of multiple sub images.

The method 300 can proceed to process block 306, where lossy reconstruction of a wavefront for actuators of an AO device is performed based on images from the afocal sensor assembly. In some embodiments, the reconstruction of process block 306 can be based on the 4D light-field information and can have a phase accuracy in a range of $\lambda/2$ to $\lambda/30$, inclusive. In some embodiments, process block 306 can comprise using a fast reconstruction algorithm, for example, employing basic graph theory in order to quickly reconstruct the wavefront. For example, lossy sampling based on spanning trees in graph theory can make use of the 4D light field information in the reconstruction.

In general, light beam detection can be considered lossy in revealing the wavefront if (a) the data are subsampled (e.g., information is lost) and/or (b) the reconstruction has multiple interpretations (e.g., contains ambiguity). Additional error can occur when formulating the lossy wavefront reconstruction to the AO device (e.g., a deformable mirror, a digital micromirror array device, a spatial light modulator, or phase modulators of a fiber laser phased array) controls, for example, due to limitations of the influence function (e.g., cross-coupling between actuators due to membrane stiffness of a deformable mirror) and/or stroke ranges. In some embodiments, the actuators can be conceptually modeled as nodes based on their geometric centers. Lossy sensing can thus lead to errors between actual and reconstructed values at these nodes, which facilitates direct evaluations.

In some embodiments, actuator displacement can be defined as $S_i$, with subscript i labeling the actuators. The relative displacement between two adjacent actuators i and j can be denoted as $S_{ij}=S_i-S_j$. If adjacent actuators are spaced equally, such as in the cases of hexagonal or square grid layouts, the lower case $s_{ij}$ can be used to indicate the local phase slope specified by the relative displacement, where $s_{ij}$ is simply the relative displacement $S_{ij}$ divided by adjacent actuator spacing $D_{ij}=D_0$. By this definition, $s_{ij}$ can match directly with slope-based wavefront sensors, such as the plenoptic sensor of FIGS. 2A-2B.

With respect to slope-based measurements:

$$s_{ij} + s_{jk} + s_{ki} = \epsilon \quad (2)$$

where $\epsilon$ represents a nonzero residue that breaks the assumption of continuous phase structure, and the subscripts i, j, k represent three adjacent nodes forming a closed loop. When the phase slope extraction is known to be sufficiently sampled, the conflict can be largely explained if it is caused by optical vortices. Otherwise, the situation cannot be easily resolved, and phase reconstruction is path dependent. Unless continuous phase structure is guaranteed, where minimum mean square error reconstruction can be safely applied, a branch in any existing loop in the measured $s_{ij}$ set can be removed for reconstruction, such that the resulting reconstruction process will be lossy. Thus, for an N-actuator AO device, only N−1 slope samples can be used to perform the reconstruction.

To better demonstrate the concept of "lossy" wavefront sensing, the algorithm can be registered on top of results from a lossless wavefront sensor, so that the proposed detection approach is lossy in sense (a) as discussed above. In some embodiments, this can be achieved by using a plenoptic sensor that maps the amplitude and phase slope distribution of a laser beam into high-density pixel data. Alternatively or additionally, in some embodiments, other afocal sensor systems can be used, such as but not limited to, a high-definition SHS with sufficient spatial resolution, a light-field camera, or a pyramid wavefront sensor. Given high-density wavefront data, the possibility of data integration can be investigated such that N−1 samples can be formulated. In some embodiments, if the integration is a summation of regional samples, masks or sub-aperture lenses can be used for near-field implementation. Alternatively or additionally, in some embodiments, if the integration requires additional phase shifts among the summed data, techniques of photonic lanterns can be applied.

For example, in some embodiments, the data integration is applied to a plenoptic sensor, such as sensor 200 of FIGS. 2A-2B. The plenoptic sensor can be configured as a mini-Keplerian telescope array resulting from a shared OLA 204 and MLA 208. In some embodiments, the wavefront correction can happen at the end of propagation that is very close to the OLA 204. In such configurations, the correction to be applied by the AO device can be treated as on-aperture wavefront correction that overlaps with the plane of OLA 204. Correspondingly, the geometry of the nodes representing the actuators of the AO device (e.g., deformable mirror) can be preserved, and the imaging of the nodes by the MLA 208 can follow the same geometric rule of a Keplerian telescope with a linear scaling ratio of $-f_2=f_1$. In other words, the AO device can be conceptually "imaged" into an image array of the plenoptic sensor 200, such that the pixel representation for each actuator node in a cell image 214 is known and precompiled in the lossy algorithm.

In some embodiments, the lossy reconstruction can follow one or more rules. For example, the lossy reconstruction rules can comprise:

(1) If both i and j are included in a wavelet imaged by a cell 210 of MLA 208 and adding $s_{ij}$ does not introduce a loop or already exist in the collected paths, then $s_{ij}$ should be included;

(2) The search can start from a central cell of MLA 208 and can expand to outer cells with incremental |M|+|K|, where (M, K) represent cell indices of the MLA 208;

(3) Any remaining node knot included in the collected set $s_{ij}$ is connected to the nearest node in the set with $s_{ki}=0$ or $s_{kj}=0$; and (4) Apply the same rule as in (3) for disconnected groups in the $s_{ij}$ set by treating them as supernodes (e.g., a vertex with a disproportionately high number of incident edges).

For example, Table 1 below illustrates an exemplary algorithm that reflects the above noted lossy reconstruction rules.

Following these rules, the lossy reconstruction can formulate a dynamic tree structure to retrieve displacements of the nodes $S_i$ with N−1 adding or subtracting based on their pairwise phase differences $S_{ij}$, which is also a direct translation of a correction command for the AO device. In some embodiments, an N-element logistic vector can be initiated with all "False" values to represent the N nodes (e.g., Table 1, Step 2). Any added $s_{ij}$ sets the i-th and j-th logistic values to be "True" (e.g., Table 1, Step 10). To add a new $s_{ij}$, at least one node's logistic flag in the vector should be "False" (e.g., Table 1, Step 9). In some embodiments, to determine if both i and j are covered by a wave component's image pattern in an MLA cell, the line of pixels connecting them can be higher than a predefined threshold (e.g., an empirical level is 0.2 of the maximum pixel value in the plenoptic image, such as 50 for 8-bit pixels; see Table 1, Step 8) In some embodiments, the connectivity can be examined by a numerical vector [1; 2; : : : ; N] for the N nodes. Both i and j can be converted to min(i, j) when $s_{ij}$ is added to the reconstruction set (e.g., Table 1, Step 11). Full connectivity can be reached when all the vector values are 1 (e.g., Table 1, Steps 13 and 16). Then the reconstruction for the node values $S_i$ can be retrieved for an AO device (e.g., Table 1, Steps 14 and 23).

blocks may occur in a different order than illustrated or simultaneously with other blocks. For example, patterning of process block 304 can form shells with multiple cores, which can be sequentially filled and capped by repeating process blocks 308-314 for each core.

TABLE 1

Exemplary Algorithm for Lossy Reconstruction Based on a Plenoptic Image

```
 1: procedure PLENOPTIC (I(s, t; M, K))
         ▶ Input: a plenoptic image
         ▶ s, t: cell image coordinates
         ▶ M, K: cell indices
 2:   NodeFlag(1 : N) ← False
   ▶ Initialize the indicators for the actuator nodes for their inclusions in the lossy
reconstruction
 3:   GroupNum(1 : N) ← 1, 2, ..., N
         ▶ Initialize the group indices to indicate connectivity
 4:   for k = 0; k < Max_cell; k + + do
         ▶ Rule 2: cell search stops at Max_cell
 5:     for i = 0; i <= k, i + + do
         ▶ Rule 2: traverse cells with equal |M| + |K|
 6:       M ← ±i, K ← ±(k - i)(k-i)
         ▶ Search for all combinations
 7:       I_cell ← cell image with indices (M, K)
 8:       if all pixels connecting i, j in I_cell > Threshold then
 9:         if [NodeFlag(i) & NodeFlag(j)] = = False then
         ▶ Rule 1: include slope information
10:           NodeFlag(i) = True, NodeFlag(j) = True
11:           GroupNum(GroupNum = = i or j) ← min(i, j)
         ▶ merge the i and j groups into one
12:         Include s_ij with its value
         ▶ with slope information obtained by (M, K)
13:         if all GroupNum(1:N) = = 1 then
14:           derive S(i = 1:N) from set s_ij
         ▶ perform reconstruction with full connectivity
15:           return S(i = 1:N)
         ▶ reconstruction completed and exit algorithm
16:   while any GroupNum(k) > 1 do
         ▶ To fix partial connectivity
17:     if #[GroupNum = = GroupNum(k)] = = 1 then
18:       Include s_kj = 0
         ▶ Rule 3, and j is an adjacent node
19:       GroupNum(k) ← GroupNum(j)
20:     else
21:       All [GroupNum = = GroupNum(k)] ← GroupNum(j)
         ▶ Rule 4, and j is an adjacent node in a different group
22:       Include s_{k*j} = 0
         ▶ k* is the node in the previous group that has value
         GroupNum(k) and is adjacent to j
23:   derive S(i = 1:N) from set s_ij
         ▶ calculate node values based on full connectivity
24:   return S(i = 1:N)
         ▶ Reconstruction completed and exit algorithm
```

Returning to FIG. 3, the method 300 can proceed to process block 308, where an AO device is controlled to modify the light beam to correct for aberration based on the lossy reconstruction. In some embodiments, the method 300 can iterate at decision block 310, for example, to improve correction and/or to compensate for aberrations introduced by dynamic turbulence. Otherwise, after process block 308, the method 300 can terminate.

Figure 4:
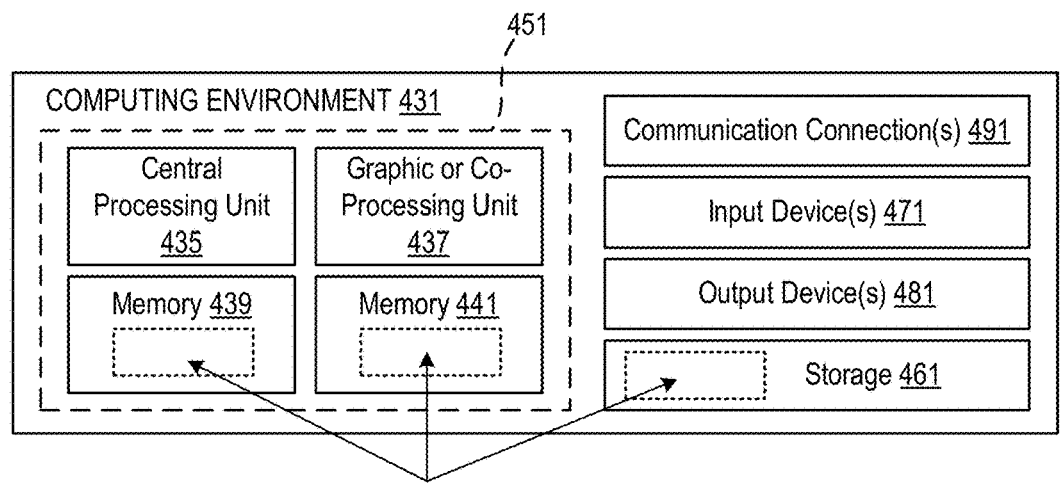
FIG. 4 depicts a generalized example of a computing environment in which the disclosed technologies may be implemented.

Although some of blocks 302-318 of method 300 have been described as being performed once, in some embodiments, multiple repetitions of a particular process block may be employed before proceeding to the next decision block or process block. In addition, although blocks 302-318 of method 300 have been separately illustrated and described, in some embodiments, process blocks may be combined and performed together (simultaneously or sequentially). Moreover, although FIG. 3 illustrates a particular order for blocks 302-318, embodiments of the disclosed subject matter are not limited thereto. Indeed, in certain embodiments, the Computer Implementations FIG. 4 depicts a generalized example of a suitable computing environment 431 in which the described innovations may be implemented, such as aspects of controller 152, controller 190, and/or method 300. The computing environment 431 is not intended to suggest any limitation as to scope of use or functionality, as the innovations may be implemented in diverse general-purpose or special-purpose computing systems. For example, the computing environment 431 can be any of a variety of computing devices (e.g., desktop computer, laptop computer, server computer, tablet computer, etc.).

With reference to FIG. 4, the computing environment 431 includes one or more processing units 435, 437 and memory 439, 441. In FIG. 4, this basic configuration 451 is included within a dashed line. The processing units 435, 437 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 4 shows a central processing unit 435 as well as a graphics processing unit or co-processing unit 437. The tangible memory 439, 441 may be volatile memory (e.g., registers, cache, RAM), non-volatile memory (e.g., ROM, EEPROM, flash memory, etc.), or some combination of the two, accessible by the processing unit(s). The memory 439, 441 stores software 433 implementing one or more innovations described herein, in the form of computer-executable instructions suitable for execution by the processing unit(s).

A computing system may have additional features. For example, the computing environment 431 includes storage 461, one or more input devices 471, one or more output devices 481, and one or more communication connections 491. An interconnection mechanism (not shown) such as a bus, controller, or network interconnects the components of the computing environment 431. Typically, operating system software (not shown) provides an operating environment for other software executing in the computing environment 431, and coordinates activities of the components of the computing environment 431.

The tangible storage 461 may be removable or non-removable, and includes magnetic disks, magnetic tapes or cassettes, CD-ROMs, DVDs, or any other medium which can be used to store information in a non-transitory way, and which can be accessed within the computing environment 431. The storage 461 can store instructions for the software 433 implementing one or more innovations described herein.

The input device(s) 471 may be a touch input device such as a keyboard, mouse, pen, or trackball, a voice input device, a scanning device, or another device that provides input to the computing environment 431. The output device(s) 471 may be a display, printer, speaker, CD-writer, or another device that provides output from computing environment 431.

The communication connection(s) 491 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, radio-frequency (RF), or another carrier.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means. In any of the above-described examples and embodiments, provision of a request (e.g., data request), indication (e.g., data signal), instruction (e.g., control signal), or any other communication between systems, components, devices, etc. can be by generation and transmission of an appropriate electrical signal by wired or wireless connections.

Fabricated Examples and Experimental Results

To illustrate implementation of a lossy reconstruction algorithm by imaging, reconstruction of a "Trefoil" phase deformed Gaussian beam with a 30 mm diameter through a plenoptic sensor was performed, for example, using the experimental setup of FIG. 6A (described in further detail hereinbelow). The Trefoil deformation can be expressed as:

$$Z_3^3(\rho, \theta) = \frac{A}{2}[\rho^3 \cos(3\theta) + 1], \tag{3}$$

where A represents the peak-to-peak value of the phase deformation (e.g., $A=11\lambda$ in the case shown in FIGS. 5A-5D), $\rho$ is the normalized radius, and $\theta$ is the azimuth angle, which goes from $-\pi$ to $\pi$. The deformation was implemented by a deformable mirror 500 (DM) (sold by Flexible Optical B.V. (OKO Tech)) with a 30 mm diameter driven by 37-channel piezoelectric actuators (e.g., with actuator layout 510), as shown in FIGS. 5E-5F.

The resulting lossy reconstruction is shown in FIGS. 5A-5D. FIG. 5A shows the plenoptic image when the Trefoil deformation is applied (cell images with low illumination are not shown). FIG. 5B shows connections from the collected $s_{ij}$ set that resemble a spanning tree. FIG. 5C shows the original phase distortion on each actuator of the DM to generate the deformation. The 3D plot is generated by linear interpolations between the sparse data. Similarly, FIG. 5D shows the reconstructed phase distortion. It is evident that the lossy reconstruction reveals the fundamental shape of the phase distortion but contains nontrivial (observable) regional errors.

In general, the lossy reconstruction can reveal a low-pass-filtered wavefront distortion. For example, taking the DM of FIGS. 5A-5F, it is readily apparent that the maximum number of actuators per dimension is seven, which indicates that the highest frequency per dimension is $f_{max}=3$. Because the algorithm is lossy, meaning that some $s_{ij}$ values are not fully covered by light and return a slope of zero value, the actual spatial frequency of reconstruction will not exceed $f_{max}$ per dimension. The optimal condition happens when the maximum spatial frequency of the wavefront is no greater than the highest spatial frequency of the DM:

$$f_{max} \leq \frac{S-1}{2}, \quad (4)$$

where S represents the maximum number of actuators in a dimension. Under optimal conditions, the lossy algorithm can become lossless. Alternatively, in some extreme cases of distortion, the lossy reconstruction can be put out of function, for example, when none of the $s_{ij}$ values are covered by any image pattern representing a wave component in the beam (e.g., meaning that each node points to a different slope in the actual wavefront distortion). When such extreme cases arise, the DM is out of its correction power and requires ones with higher node (actuator) resolution for wavefront correction. However, other than the extreme cases, each reconstruction can utilize at least one effective $s_{ij}$ and can make corresponding corrections. In some instances, the lossy approach can take a maximum of N−1 iterations to fulfill a wavefront correction, which can thus avoid the uncertainty of convergence in wavefront sensorless AO approaches. When compared with lossless wavefront reconstruction with one-step DM correction, the lossy algorithm approach may take more iterations; however, it can do so while saving on overall time consumption via a much-reduced algorithm time (as the computational complexity of the lossy approach is linear with the sample size per dimension and does not visit all the pixels).

Figure 6A:
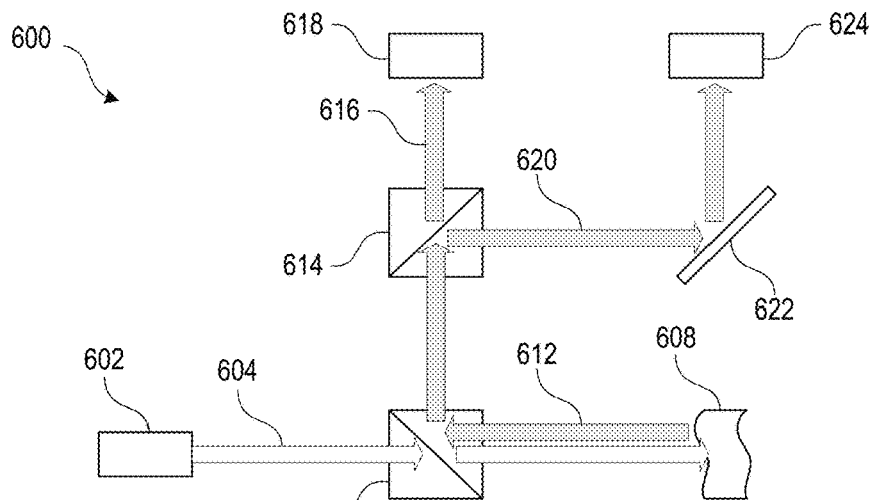
FIG. 6A is a simplified schematic diagram of an experimental setup for testing lossy reconstruction with respect to static distortions.

To demonstrate the effectiveness of the lossy approach, the experimental setup 600 of FIG. 6A was used. Laser 602 was a 5 mW, 632.8 nm He—Ne laser source (Thorlabs: HNL050L). The output of the laser 602 was expanded to a collimated beam 604 with a 40 mm diameter. The beam 604 propagated through a 50 mm cubic beam splitter 606 and reflected off the surface of a DM 608 (e.g., having the same construction as DM 500 of FIGS. 5E-5F). The reflected beam 612 was apertured by the DM 608 with a diameter of 30 mm and a superposed phase change. Then the distorted beam 620 with a 30 mm diameter was directed to the plenoptic sensor 624 via beam splitter 614 and adjustable mirror 622, so as to measure the phase distortion.

A secondary channel directs the distorted beam 616 to a photodetector 618 to determine the ratio of optical power delivery after being affected by the distortion. This secondary channel uses an aspherical lens (not shown) of focal length 150 mm and a pinhole (not shown) with a 0.1 mm diameter placed at the back focal spot of the lens. Photodetector 618 (Thorlabs: PDA100A) is placed behind the pinhole. Due to the thickness of the pinhole (around 0.5 mm), the pinhole size was set larger than the ideal width of a diffraction-limited focus (about 4 μm) to maximize readout on the photodetector in the absence of phase distortion. By this arrangement, phase distortion can lead to a noticeable drop in signal on the photodetector 618.

Because beam splitter 614 was 50/50 nonpolarizing and both branches 616, 620 had undergone the same distortion, the power delivery on the secondary branch equals the power delivery on the first branch that adaptively senses the distortion and makes corrections. Intuitively, the branch acts like a near-field implementation of power-in-bucket (PIB) measurement in evaluating the quality of the beam correction. The PS 624 uses an Allied Vision GX1050 monochrome camera (1024×1024 resolution and 5.5 μm pixel width, operating at 109 frames per second [fps]) as its image sensor. The objective lens of PS 624 has a clear aperture of 50 mm and a focal length of 750 mm. The MLA of PS 624 is a 10 mm×10 mm microlens array with a 300 μm cell width and 5.1 mm focal length (Edmund Optics: 64-476). Limited by the size of the image sensor, the PS 624 has 18×18 (324) as the maximum number of image cells To test the ability of the lossy reconstruction approach to correct static distortions, a known phase distortion was applied to the DM 608, and it was examined how the lossy algorithm by the PS 624 offsets this distortion iteratively. In particular, the first few Zernike polynomials were implementable by the DM 608. Due to their orthogonality, this helps us understand the basic function and performance boundary (in the number of steps necessary for correction) of the lossy approach. Higher-order Zernike polynomials (e.g., above $Z_4^4$) cannot be implemented by the DM 608 and were excluded from the experiments. The basic Zernike polynomial distortions also ensured that the PS 624 obtained lossless information regarding the wavefront. As the optical irradiance has a fixed split ratio between the two branches, either (i) the ratio of the summed pixel values outside the central cell image versus the total pixel values (noted as Metric 1), or (ii) the power ratio on the photodetector versus its readout in the absence of turbulence (noted as Metric 2) can be used as a metric to show the improvement. For example, Metric 1 can measure the power-outside-bucket (POB), and Metric 2 can measure the PIB. The two are complementary to each other, meaning they have a summation of unity despite small discrepancies.

Figure 6B:
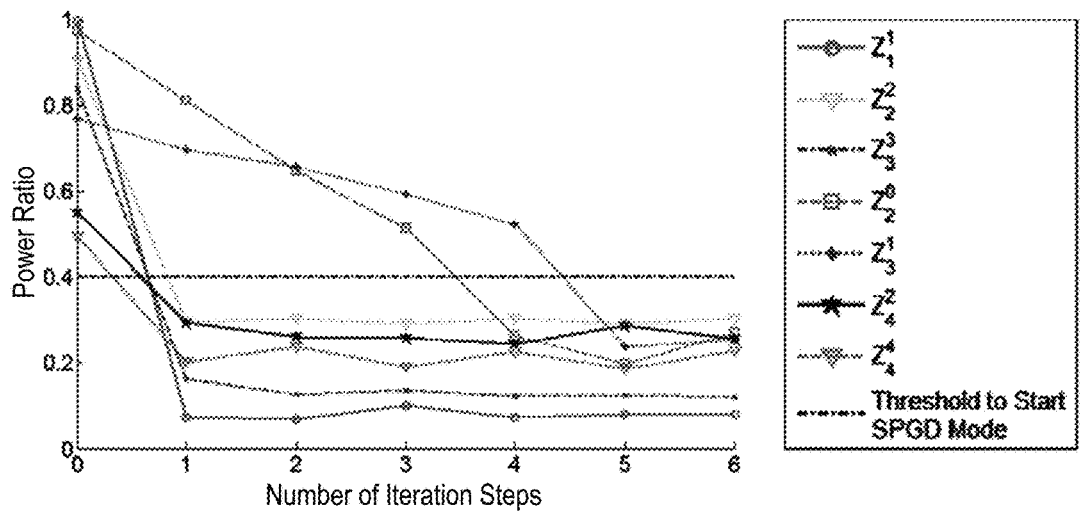
FIG. 6B is a graph illustrating power ratio for initial steps in an iterative lossy reconstruction-based correction for various Zernike polynomial phase deformations with a peak-to-peak value of $22\pi$.

FIG. 6B shows the static phase correction results (using Metric 1) obtained using the setup of FIG. 6A for various Zernike polynomial distortions. As is apparent from FIG. 6B, the lossy sensing approach can effectively suppress most of the Zernike phase distortions in one iteration, which can lead to a metric value of 0.3 or less. For distortions like defocus (e.g., $Z_2^0$) or coma (e.g., $Z_3^1$), the lossy approach can take four or five steps to suppress half of the distortion and converge to a metric value of 0.3 or less. Such results are expected from theoretical analysis, where the number of steps needed stays between 1 and N−1 (e.g., 36 in this experimental case). In general, the maximum iteration number in the lossy-sensing-based correction (N−1) is given by the number of the DM actuators (N), which is independent of the experimental setup.

In FIG. 6B, only the initial six steps are shown, as the corrections have been completed by then and entered a flat stage (e.g., as measured by the metric values). Another observation is that the lossy algorithm does not improve much after a few iterations. This may be due to two factors: (1) quantized phase slopes by the PS 624 and/or (2) loss of information for more delicate phase reconstruction. Since most $s_{ij}$ information is fetched from the center cell after the initial corrections (e.g., meaning most of the light has been converged back to the central cell), the improvement comes to a stop. In some embodiments, further optimization can be provided for additional improvement, for example, a stochastic parallel gradient descent (SPGD) approach that focuses on maximizing Metric 2 or minimizing Metric 1. For example, an arbitrary threshold at the value 0.4 is marked in FIG. 6B to denote that the lossy approach can concatenate with the SPGD algorithm for further improvement.

Figure 6C:
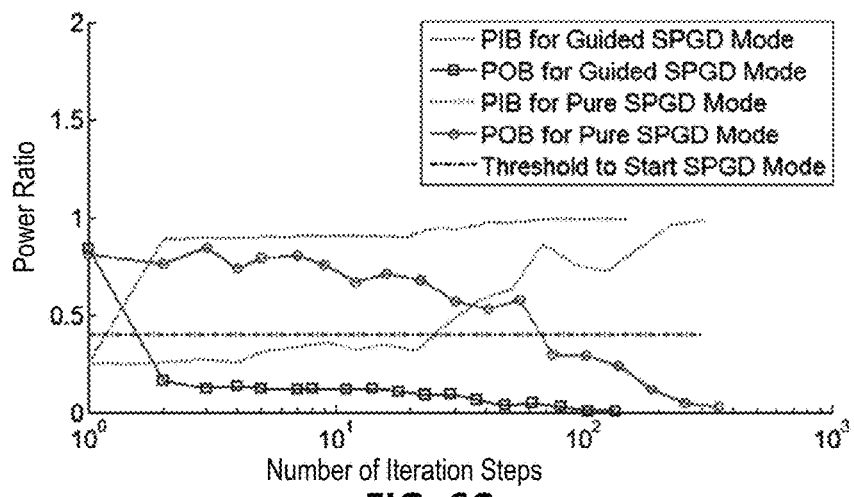
FIG. 6C is a graph illustrating power ratio for iterative correction results with and without lossy sensing and correction for trefoil deformation.

In another experiment, the example of Trefoil (e.g., $Z_3^3$) phase distortion was applied to the DM 608, and SPGD corrections with and without the preceding lossy sensing correction were employed. The comparison, measured by iteration steps, is shown in FIG. 6C for both Metrics 1 and 2. The lossy reconstruction typically takes 0.5 ms reconstruction time (on an Intel i7 CPU), which is an affordable loss with regard to the typical 10 kHz SPGD operation speed. In FIG. 6C, the blue dashed line represents Metric 2 measurement of SPGD correction with preceding lossy correction, and the blue solid line represents Metric 1 measurement of the same process. For convenience, this concatenating process was called "Guided SPGD," as the lossy approach seems to find a better starting point for SPGD. The concatenating point (switch point) is set when Metric 1 drops below the threshold of 0.4. To show situations without the preceding lossy correction, the dashed and solid red lines represent Metric 2 and Metric 1 measurements of pure SPGD results, respectively.

A subtle obstacle in implementing the SPGD is that the DM can introduce hysteresis, where reversed movements of actuators in adjacent iterations often contain errors. As a result, conventional SPGD expects non-decreasing improvement every two iterations, while experiments have otherwise shown some backward changes due to device errors. Because SPGD can take hundreds of iterations for convergence to a good result, the X-axis in FIG. 6C has been plotted in log scale to show both the lossy correction and the SPGD correction clearly. It is evident from FIG. 6C that the "Guided SPGD" takes around 30 iterations to achieve 90% PIB, while the "Pure SPGD" takes more than 300 iterations. Given the fact that the time penalty for finding a good starting point with the lossy algorithm is comparable to 50 SPGD iterations or less, at least one method (Guided SPGD) of improved correction by the lossy approach has been found, which supports the initial concept of lossy wavefront sensing and correction. For all the large Zernike distortion cases shown in FIG. 6B, starting SPGD at the initial distortion can result in 200-340 iterations to reach 90% PIB. Comparatively, starting SPGD after the sixth lossy correction steps results in 20-43 iterations to reach 90% PIB. The difference suggests that the lossy approach, even partially introduced to the sensorless approaches as a means for trade-offs, can help speed up the convergence speed.

Figure 7A:
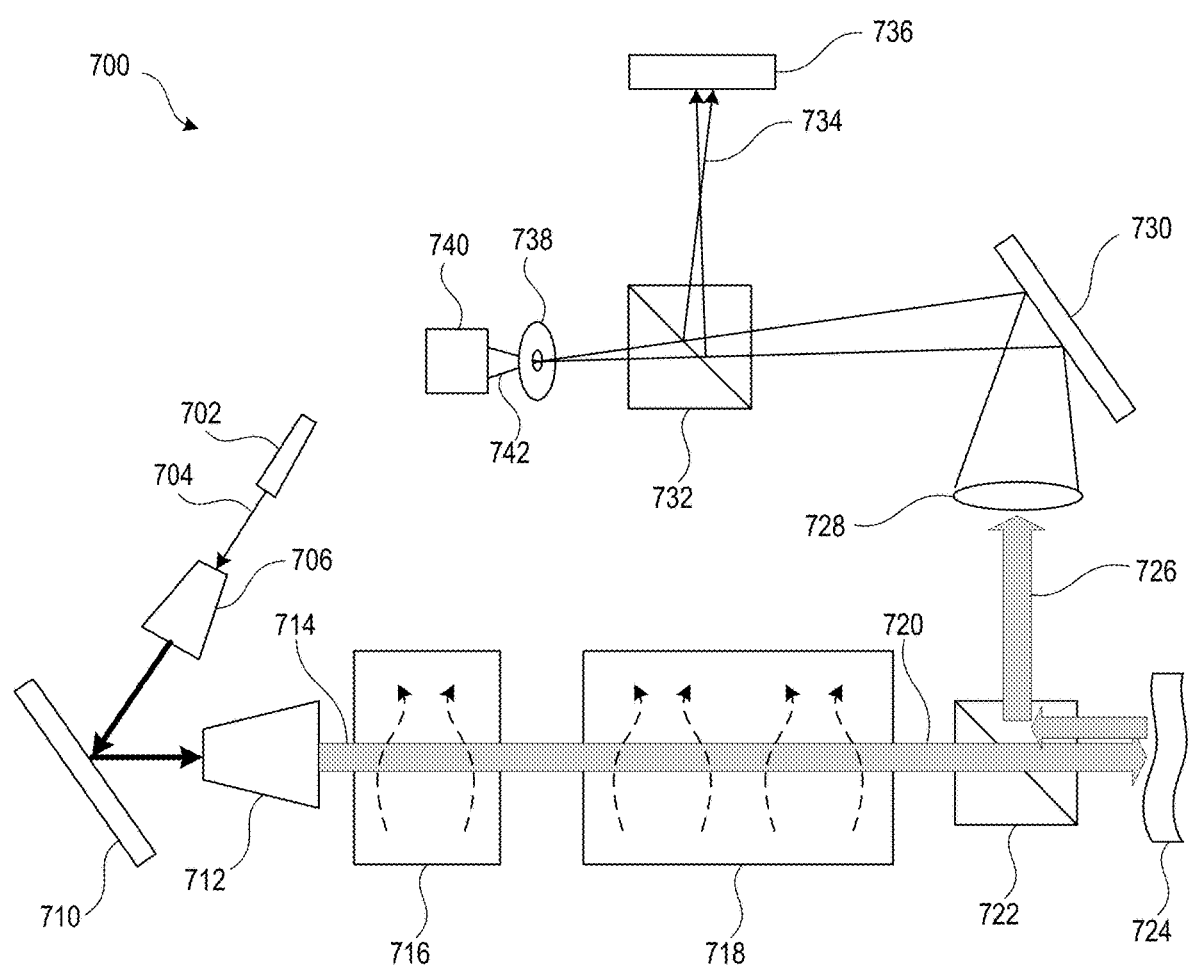
FIG. 7A is a simplified schematic diagram of an experimental setup for testing lossy reconstruction with respect to dynamic distortions.
Figure 7B:
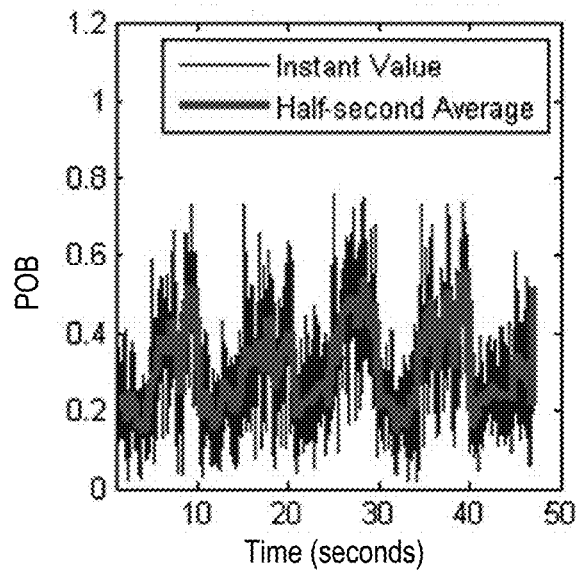
FIGS. 7B-7E are graphs illustrating power ratio versus time for lossy reconstruction-based correction of dynamic aberrations caused by hot plate temperatures of 200° F., 225° F., 250° F., and 300° F., respectively.
Figure 7C:
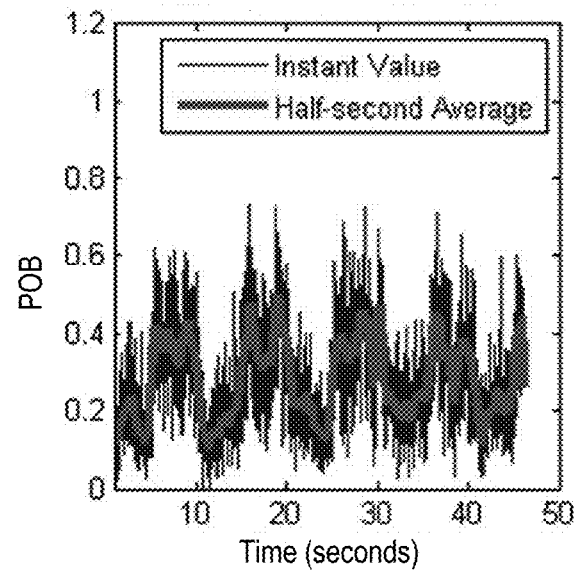
Figure 7D:
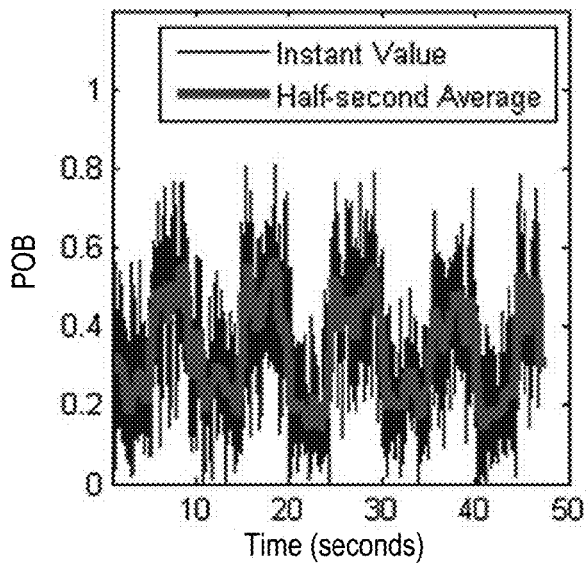
Figure 7E:
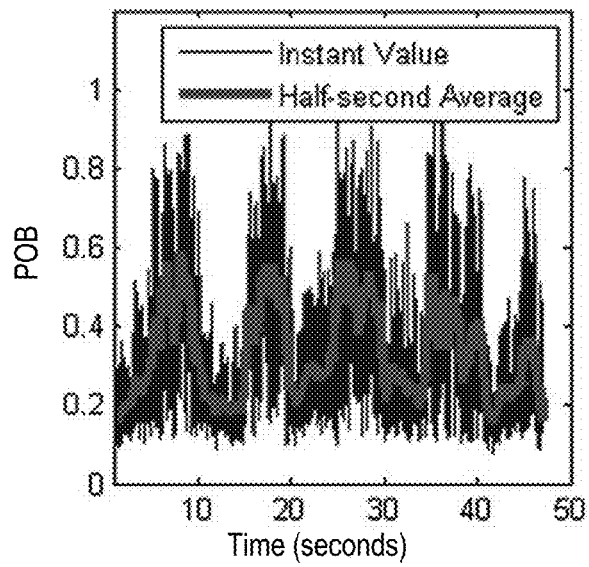

To demonstrate the effectiveness of the lossy approach in correcting dynamic beam distortions, the experimental setup 700 of FIG. 7A was used. Such dynamic beam distortions can arise in the context of long-range free-space optical or underwater optical communication, which require new techniques to stabilize the optical link through a turbulent channel. Active beam control can also help with communication security that avoids interception by unwanted parties.

In the setup 700 of FIG. 7A, the output 704 of laser 702 was expanded to a collimated beam 714 via first stage expander 706, flat mirror 710, and second stage expander 712. The beam 714 propagated over second hotplate 716 and first hotplate 718, which created dynamic distortions (e.g., atmospheric turbulence). The aberrated light beam 720 propagated through a non-polarizing beam splitter 722 and reflected off the surface of a DM 724 (e.g., having the same construction as DM 500 of FIGS. 5E-5F). The corrected beam 726 was apertured by the DM 724 with a diameter of 30 mm and a superposed phase change. Then the corrected beam 726 was directed to the plenoptic sensor. In particular, the corrected beam 726 was directed through a common objective lens 728 of the plenoptic sensor and then directed onto MLA 736 via beam splitter 732 and mirror 730, so as to measure the phase distortion. The MLA 736 can direct the sampled light 734 onto a photodetector (not shown), for example, having a phase slope resolution of $0.175\pi$ per mm and an acquisition speed of 500 fps. A secondary channel directs a portion 742 of the corrected beam 726 to a photodetector 740 to determine the ratio of optical power delivery after being corrected for distortion. This secondary channel uses the common objective lens 728 and a pinhole 738.

The increased phase slope resolution allowed application of the lossy sensing and correction continuously without relying on other optimization approaches, which led to a higher value in Metric 2 measurement (e.g., typically staying around 0.8 or above, which suggests less than 20% energy loss). The hotplates 716, 718 were turned on at 200° F., 225° F., and 250° F. to create equivalent scintillation (measured by the photodetector 740 branch) of a 1.0 km turbulence channel with $C_n^2=5.6\times10^{-14}$, $C_n^2=1.0\times10^{-13}$, and $C_n^2=2.5\times10^{-13}$, respectively. These cases reflect turbulence levels from intermediate to strong in reality. For stronger turbulence driven by a higher heating temperature, the scintillation index begins to saturate, and therefore higher heating temperatures cannot be used for an estimation of the turbulence strength. Thus, the 300° F. case was added to the comparison for additional demonstration, but its equivalent turbulence strength over a standard 1.0 km channel was not given. In the comparison, the lossy correction was alternately turned on/off every 5 s. The results are shown in FIGS. 7B-7E.

In FIGS. 7B-7E, Metric 1 was used to determine the POB in each artificial distortion case, and both the instant metric value (marked by the blue lines) and the half-second averaged value (marked by the red lines) were shown to denote the effects with and without the lossy approach. It is evident that the lossy sensing technique can effectively suppress turbulence distortion when it is used. The POB can be typically reduced from an average value of 0.55 or above to an average value around 0.23, which proves that the lossy approach is fundamentally applicable to turbulence compensation.

A closed-loop speed of 213 Hz was achieved, with an image acquisition time of 2 ms, DM setup time of 1 ms, algorithm time of 0.5 ms, and image-based metric calculation time of 1.2 ms. Such speeds can be fast enough to view the dynamic distortion as semi-static cases for adjacent iterations. Due to the natural limit of the lossy approach (as discussed in detail above), the corrected POB cannot be maintained much lower than 0.2. In addition, as the dynamic turbulence distortion was constantly changing, the differential change between adjacent corrections can cause certain levels of signal fluctuation (around ±0.1 in the POB for the above experiments) when the algorithm tries to maintain a stable beam over the turbulent channel.

For comparison, the full wavefront reconstruction guided beam correction was tried using the same platform for the distortion cases shown in FIGS. 7B-7E, but improvement was not noticeable. This may be due to the increased algorithm time (e.g., from 0.5 ms to 9.3 ms) required for the PS's lossless reconstruction, which was otherwise not fast enough to follow up with the dynamic phase changes in the beam. SPGD-based wavefront sensorless approach was also implemented using the same platform (e.g., with a closed-loop speed of 400 Hz), but it also failed to deliver meaningful correction. As slow convergence is a common issue in the wavefront sensorless approach, the lack of improvement for the SPGD-based wavefront sensorless approach was not unexpected. Rather, meaningful correction is expected to require a much faster speed, for example, around 10 kHz. Therefore, given the same hardware configuration, the lossy approach disclosed herein serves as a trade-off solution that provides dynamic wavefront correction abilities, which are not provided by the aforementioned two comparison cases.

CONCLUSION

Although some of the embodiments described above refer to "imaging," the production of an actual image is not strictly necessary. Indeed, the mentions of "imaging" are intended to include the acquisition of data where an image may not be produced. Accordingly, the use of the term "imaging" herein should not be understood as limiting.

Although particular optical components and configuration have been illustrated in the figures and discussed in detail herein, embodiments of the disclosed subject matter are not limited thereto. Indeed, one of ordinary skill in the art will readily appreciate that different optical components or configurations can be selected and/or optical components added to provide the same effect. In practical implementations, embodiments may include additional optical components or other variations beyond those illustrated, for example, additional reflecting elements to redirect a beam path to fit a particular geometry. Accordingly, embodiments of the disclosed subject matter are not limited to the particular optical configurations specifically illustrated and described herein.

Any of the features illustrated or described herein, for example, with respect to FIGS. 1A-7E, can be combined with any other feature illustrated or described herein, for example, with respect to FIGS. 1A-7E to provide systems, optical assemblies, methods, and embodiments not otherwise illustrated or specifically described herein. For example, the plenoptic sensor illustrated in FIGS. 2A-2B can be used in the method 300 of FIG. 3 and/or in the system of any of FIGS. 1C-1D, 6A, and 7A. In another example, the deformable mirror illustrated in FIGS. 5E-5F can be used in the method 300 of FIG. 3 and/or the system of any of FIGS. 1C, 6A, and 7A. Other combinations and variations are also possible according to one or more contemplated embodiments. Indeed, all features described herein are independent of one another and, except where structurally impossible, can be used in combination with any other feature described herein.

In view of the many possible embodiments to which the principles of the disclosed technology may be applied, it should be recognized that the illustrated embodiments are only examples and should not be taken as limiting the scope of the disclosed technology. Rather, the scope is defined by the following claims. We therefore claim all that comes within the scope and spirit of these claims.

The invention claimed is:

1. A light beam correction system comprising:
   (a) a plenoptic sensor module comprising:
      an objective lens assembly (OLA) having a first effective focal length (EFL) and being arranged to receive a light beam with an aberrated wavefront and a wavelength, $\lambda$;
      a microlens array (MLA) having a second EFL and being arranged to receive the light beam from the OLA; and
      a photodetector having a two-dimensional array of pixels and being arranged to receive the light beam from the MLA,
      wherein a focal plane at the first EFL behind the OLA coincides with a focal plane at the second EFL in front of the MLA, and an imaging plane of the photodetector coincides with a focal plane at the second EFL behind the MLA, and
   (b) a controller comprising one or more processors and computer readable storage media storing instructions that, when executed by the one or more processors, cause the controller to:
      (i) receive one or more signals from the photodetector indicative of sorted four-dimensional (4D) light field information regarding the light beam;
      (ii) reconstruct the aberrated wavefront of the light beam based on the sorted 4D light-field information, the reconstructed wavefront having a phase accuracy in a range of $\lambda/2$ to $\lambda/30$, inclusive; and
      (iii) control, based on the reconstructed wavefront, a plurality of actuators of an adaptive optics (AO) device so as to modify the light beam to correct for an aberration of the wavefront.

2. The light beam correction system of claim 1, wherein:
   each microlens cell of the MLA forms a respective cell image on the imaging plane of the photodetector, and
   the computer readable storage media store additional instructions that, when executed by the one or more processors, cause the controller to further, prior to the reconstruction of (ii), map locations of the actuators of the AO device to respective pixels in each cell image.

3. The light beam correction system of claim 1, wherein the reconstruction of (ii) comprises deriving slopes between adjacent actuators indicative of actuator displacements based at least in part on the mapped locations and a detected image for each microlens cell.

4. The light beam correction system of claim 3, wherein the reconstruction of (ii) comprises, based on detection of light at a corresponding pixel in the cell image, assembling a collected set of actuator nodes.

5. The light beam correction system of claim 4, wherein the reconstruction of (ii) further comprises based on detection of light at the corresponding pixel in the cell image, assembling a group of one or more actuator nodes disconnected from the collected set.

6. The light beam correction system of claim 1, wherein an f-number of the MLA and an f-number of the OLA are substantially the same.

7. The light beam correction system of claim 1, wherein the first EFL is in a range of 750 mm to 3500 mm, inclusive.

8. The light beam correction system of claim 1, wherein the second EFL is in a range of 7.1 mm to 31.0 mm, inclusive.

9. The light beam correction system of claim 1, wherein the light beam is substantially monochromatic and $\lambda$ is in a range of 400 nm to 2000 nm, inclusive.

10. The light beam correction system of claim 1, wherein the OLA and the MLA form an afocal optical assembly.

11. The light beam correction system of claim 1, wherein the AO device comprises a deformable mirror, a digital micromirror array device, a spatial light modulator, or phase modulators of a fiber laser phased array.

12. A system comprising:
a light beam optical assembly comprising an adaptive optics (AO) device, the light beam optical assembly being constructed to output a light beam having a wavelength, $\lambda$; and
a light beam correction module constructed to detect the light beam after passing through atmospheric turbulence and to generate one or more control signals that cause the AO device to modify the light beam to correct for aberration of a wavefront of the light beam due to the atmospheric turbulence,
wherein the light beam correction module comprises:
an afocal sensor assembly; and
a controller comprising one or more processors and computer readable storage media storing instructions that, when executed by the one or more processors, cause the controller to:
perform a lossy reconstruction of an aberrated wavefront for actuators of the AO device based on one or more images of the light beam detected by the afocal sensor assembly; and
control the AO device based on the lossy reconstruction to correct the light beam,
wherein the afocal sensor assembly comprises a plenoptic sensor, a Shack-Hartmann system (SHS), a pyramid wavefront sensor, or a light-field camera, and
wherein the lossy reconstruction is performed in less than or equal to 1.0 ms.

13. The system of claim 12, wherein the light beam optical assembly comprises a laser, and the AO device comprises a deformable mirror, a digital micromirror array device, or a spatial light modulator.

14. The system of claim 12, wherein the light beam optical assembly comprises a fiber laser phased array, and the AO device comprises phase modulators of the fiber laser phased array.

15. The system of claim 12, wherein the lossy reconstruction is based on 4D light-field information and has a phase accuracy in a range of $\lambda/2$ to $\lambda/30$, inclusive.

16. The system of claim 12, wherein:
the afocal sensor assembly is a plenoptic sensor comprising:
an objective lens assembly (OLA) having a first effective focal length (EFL) in a range of 750 mm to 3500 mm, inclusive;
a microlens array (MLA) having a second EFL in a range of 7.1 mm to 31.0 mm, inclusive; and
a photodetector having a two-dimensional array of pixels;
a focal plane at the first EFL behind the OLA coincides with a focal plane at the second EFL in front of the MLA, and an imaging plane of the photodetector coincides with a focal plane at the second EFL behind the MLA; and
$\lambda$ is in a range of 400 nm to 2000 nm, inclusive.

17. A method comprising:
(a) directing a light beam having a wavelength, $\lambda$, through atmospheric turbulence such that a wavefront of the light beam is aberrated;
(b) detecting a plenoptic image of the light beam after the atmospheric turbulence using a plenoptic sensor module, the plenoptic sensor module comprising an objective lens assembly (OLA), a microlens assembly (MLA), and a photodetector, the OLA having a first effective focal length (EFL), the MLA having a second EFL, a focal plane at the first EFL behind the OLA coinciding with a focal plane at the second EFL in front of the MLA, and an imaging plane of the photodetector coinciding with a focal plane at the second EFL behind the MLA; and
(c) modifying, using an adaptive optics (AO) device, the light beam prior to the atmospheric turbulence based on a sampled set of pixels in the detected plenoptic image to correct for the aberrated wavefront that are correspondingly mapped to actuator geometry of the AO device,
wherein the modifying of (c) comprises:
reconstructing a wavefront for actuators of the AO device based on sorted 4D light-field information in the plenoptic image of the light beam, the reconstructed wavefront having a phase accuracy in a range of $\lambda/2$ to $\lambda/30$, inclusive; and
controlling, based on the reconstructed wavefront, the actuators of the AO device so as to modify the light beam to correct for the aberrated wavefront.

18. The method of claim 17, wherein the reconstructing comprises:
assembling, based on detection of light at a corresponding pixel in a cell image, a collected set of actuator nodes and a group of one or more actuator nodes disconnected from the collected set; and
deriving slopes between adjacent actuators indicative of actuator displacements based at least in part on the assembling.

19. The method of claim 17, wherein:
the plenoptic sensor module comprises:
an objective lens assembly (OLA) having a first effective focal length (EFL) in a range of 750 mm to 3500 mm, inclusive;
a microlens array (MLA) having a second EFL in a range of 7.1 mm to 31.0 mm, inclusive; and
a photodetector having a two-dimensional array of pixels;
a focal plane at the first EFL behind the OLA coincides with a focal plane at the second EFL in front of the MLA, and an imaging plane of the photodetector coincides with a focal plane at the second EFL behind the MLA;
$\lambda$ is in a range of 400 nm to 2000 nm, inclusive; and
the AO device comprises a deformable mirror, a digital micromirror array device, a spatial light modulator, or phase modulators of a fiber laser phased array.

* * * * *